United States Patent
Yao et al.

(10) Patent No.: US 11,370,885 B2
(45) Date of Patent: Jun. 28, 2022

(54) RESIN COMPOSITION AND ARTICLE MADE THEREFROM

(71) Applicant: Elite Electronic Material (Kunshan) Co., Ltd., Kunshan (CN)

(72) Inventors: Xingxing Yao, Kunshan (CN); Rongtao Wang, Kunshan (CN); Ningning Jia, Kunshan (CN)

(73) Assignee: ELITE ELECTRONIC MATERIAL (KUNSHAN) CO., LTD., Kunshan (CN)

( * ) Notice: Subject to any disclaimer, the term of this patent is extended or adjusted under 35 U.S.C. 154(b) by 490 days.

(21) Appl. No.: 16/561,828

(22) Filed: Sep. 5, 2019

(65) Prior Publication Data

US 2021/0009759 A1    Jan. 14, 2021

(30) Foreign Application Priority Data

Jul. 11, 2019    (CN) .......................... 201910624225.7

(51) Int. Cl.
| | | |
|---|---|---|
| C08L 79/08 | (2006.01) | |
| C08G 73/02 | (2006.01) | |
| C08L 47/00 | (2006.01) | |
| C08L 65/00 | (2006.01) | |
| C08L 33/14 | (2006.01) | |
| C08J 5/24 | (2006.01) | |
| C08L 25/16 | (2006.01) | |

(52) U.S. Cl.
CPC ............ *C08G 73/0233* (2013.01); *C08J 5/24* (2013.01); *C08L 25/16* (2013.01); *C08L 33/14* (2013.01); *C08L 47/00* (2013.01); *C08L 65/00* (2013.01); *C08L 2201/02* (2013.01); *C08L 2203/16* (2013.01); *C08L 2203/20* (2013.01); *C08L 2312/02* (2013.01)

(58) Field of Classification Search
CPC .......... C08L 33/14; C08L 47/00; C08L 65/00; C08L 2201/02; C08L 2201/08; C08L 2203/16; C08L 2203/20; C08L 2205/03; C08L 2312/02; C08L 35/00; C08L 79/085; C08G 73/0233; C08G 2261/1414; C08G 2261/1422; C08G 2261/1424; C08G 2261/148; C08G 2261/312; C08G 2261/3325

See application file for complete search history.

(56) References Cited

U.S. PATENT DOCUMENTS

| | | | |
|---|---|---|---|
| 8,410,202 B1 * | 4/2013 | Wu | ..................... C08G 65/007 524/113 |
| 2014/0154939 A1 * | 6/2014 | Rong | ................... H05K 1/0373 428/221 |
| 2018/0371243 A1 * | 12/2018 | Hu | ........................ C08L 79/085 |

OTHER PUBLICATIONS

Demir, K.D., et al.; Reactive & Functional Polymers, 2013, vol. 73, p. 346-359.*

* cited by examiner

*Primary Examiner* — Robert S Jones, Jr.
(74) *Attorney, Agent, or Firm* — Muncy, Geissler, Olds & Lowe, P.C.

(57) ABSTRACT

A resin composition comprises a prepolymer of crosslinking agent and benzoxazine resin and a maleimide resin. The resin composition may be used to make various articles, such as a prepreg, a resin film, a resin-coated copper, a laminate or a printed circuit board, and achieves improvements in at least one, more or all of the properties including laminate reflow shrinkage, T288 thermal resistance, ten-layer board T300 thermal resistance, dissipation factor, copper foil peeling strength, and resin filling property in open area.

16 Claims, No Drawings

RESIN COMPOSITION AND ARTICLE MADE THEREFROM

CROSS-REFERENCE TO RELATED APPLICATION

This application claims the priority benefits of China Patent Application No. 201910624225.7, filed on Jul. 11, 2019, the entirety of which is hereby incorporated by reference herein and made a part of this specification.

BACKGROUND

1. Field of the Disclosure

The present disclosure relates to a resin composition and an article made therefrom and more particularly to a resin composition useful for preparing an article such as a prepreg, a resin film, a resin-coated copper, a laminate or a printed circuit board.

2. Description of Related Art

With the advent of the 5G generation, printed circuit boards for mobile communication and automobile electronics have been upgraded, which further drives the technology advancement of the fundamental insulation materials in the printed circuit boards toward the direction of low dielectric properties and high reliability, and in the meantime presents higher demands in the overall performance, including high thermal resistance, low reflow shrinkage, etc., so as to meet the processability requirements of printed circuit boards involving multiple lamination and multiple assembly operations.

Conventionally, to achieve high reliability, maleimide resins were usually chosen to make laminates and printed circuit boards; however, maleimide resins have high crosslinking density, so products made therefrom are brittle and have high shrinkage. Benzoxazine resins do not involve small molecule release during the curing process, so the cured products thereof have the advantages of low shrinkage and low water absorption; accordingly, benzoxazine resins were usually used with maleimide resins to improve the overall performance of the products. However, conventional benzoxazine resins produce a large amount of hydroxyl groups during the curing process and fail to fully participate the curing reaction in the free radical polymerization system. In addition, they have poor compatibility with maleimide resins and tend to form microscopic phase separation after curing, making products have poor dielectric properties and thermal resistance and high reflow shrinkage.

SUMMARY

In view of the problems facing prior arts, particularly one or more technical problems associated with conventional materials failing to meet the demands of laminate reflow shrinkage, T288 thermal resistance, ten-layer board T300 thermal resistance, dissipation factor, copper foil peeling strength, resin filling property in open area, etc., the present disclosure provides a resin composition, comprising:

(A) 10 parts by weight to 45 parts by weight of a prepolymer of crosslinking agent and benzoxazine resin; and
(B) 30 parts by weight to 70 parts by weight of a maleimide resin.

The prepolymer of crosslinking agent and benzoxazine resin refers to a product of a prepolymerization reaction of the crosslinking agent and the benzoxazine resin under proper conditions.

Preferably, the prepolymer of crosslinking agent and benzoxazine resin comprises a prepolymer of olefin and benzoxazine resin, a prepolymer of acrylate and benzoxazine resin, a prepolymer of unsaturated bond-containing acyl chloride and benzoxazine resin, or a combination thereof.

Examples of the olefin are not particularly limited and may comprise, but not limited to, various olefins containing two or more unsaturated bonds per molecule known in the art to which this disclosure pertains; examples include but are not limited to styrene-butadiene-divinylbenzene terpolymer, styrene-butadiene-maleic anhydride terpolymer, vinyl-polybutadiene-urethane oligomer, styrene-butadiene copolymer, styrene-isoprene copolymer, maleic anhydride-butadiene copolymer, polybutadiene, polyisoprene, butadiene, dicyclopentadiene, bis(vinylbenzyl)ether, 1,2-bis(vinylphenyl) ethane, divinylbenzene, triallyl isocyanurate, triallyl cyanurate, 1,2,4-trivinyl cyclohexane, or a combination thereof.

Examples of the acrylate are not particularly limited and may comprise, but not limited to, various bifunctional acrylates, trifunctional acrylates and multi-functional acrylates containing two or more unsaturated bonds per molecule known in the art to which this disclosure pertains; examples include but are not limited to cyclohexane dimethanol di(meth)acrylate, ethylene glycol di(meth)acrylate, 1,4-butylene glycol di(meth)acrylate, ethoxylated bisphenol A di(meth)acrylate, tricyclodecane di(meth)acrylate, trimethylolpropane tri(meth)acrylate, [(octahydro-4,7-methano-1H-indene-5,6-diyl)bis(methylene)] di(meth)acrylate, tris(2-hydroxyethyl) isocyanurate tri(meth)acrylate, trimethylolpropane tri(meth)acrylate, ethoxylated trimethylolpropane tri(meth)acrylate, pentaerythritol tetra(meth)acrylate, or a combination thereof.

Examples of the unsaturated bond-containing acyl chloride are not particularly limited and may comprise various acyl chlorides containing one or more unsaturated bonds per molecule known in the art to which this disclosure pertains; examples include but are not limited to methacryloyl chloride, cinnamyl chloride, crotonyl chloride, trans-8-methyl-6-nonanoyl chloride, 10-undecenoyl chloride, or a combination thereof.

The unsaturated bond described herein, unless otherwise specified, refers to a reactive unsaturated bond, such as but not limited to an unsaturated double bond with the potential of being crosslinked with other functional groups, such as an unsaturated carbon-carbon double bond with the potential of being crosslinked with other functional groups, but not limited thereto.

Examples of the benzoxazine resin are not particularly limited and may comprise various benzoxazine resins known in the art to which this disclosure pertains; examples include but are not limited to bisphenol A benzoxazine resin, bisphenol F benzoxazine resin, phenolphthalein benzoxazine resin, dicyclopentadiene benzoxazine resin, phosphorus-containing benzoxazine resin, diamino benzoxazine resin, unsaturated bond-containing benzoxazine resin, or a combination thereof.

Preferably, the prepolymer of crosslinking agent and benzoxazine resin described herein comprises a prepolymer of polybutadiene and benzoxazine resin, a prepolymer of dicyclopentadiene and benzoxazine resin, a prepolymer of tris(2-hydroxyethyl) isocyanurate triacrylate and benzoxazine resin, a prepolymer of methacryloyl chloride and benzoxazine resin, or a combination thereof.

Preferably, the prepolymer of crosslinking agent and benzoxazine resin described herein comprises a structure of Formula (1) below:

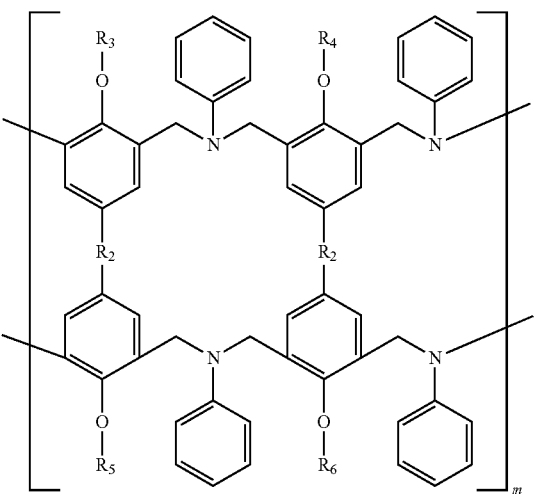

Formula (1)

wherein $R_2$ is a covalent bond, $-CH_2-$, $-CH(CH_3)-$ or $-C(CH_3)_2-$; preferably, $R_2$ is $-C(CH_3)_2-$. $R_3$, $R_4$, $R_5$ and $R_6$ each independently represent hydrogen or an unsaturated bond-containing group, and $R_3$, $R_4$, $R_5$ and $R_6$ are not hydrogen at the same time; for example, $R_3$ and $R_4$ represent an unsaturated bond-containing group, and $R_5$ and $R_6$ represent hydrogen; or $R_3$ and $R_6$ represent an unsaturated bond-containing group, and $R_4$ and $R_5$ represent hydrogen; or $R_3$ and $R_5$ represent an unsaturated bond-containing group, and $R_4$ and $R_6$ represent hydrogen; or $R_3$, $R_4$, $R_5$, and $R_6$ represent an unsaturated bond-containing group; or $R_3$, $R_4$ and $R_5$ represent an unsaturated bond-containing group, and $R_6$ represents hydrogen. m is an integer of 1 to 10, preferably an integer of 1 to 3.

More preferably, the prepolymer of crosslinking agent and benzoxazine resin comprises a structure of any one of Formula (2) to Formula (9) below or a combination thereof:

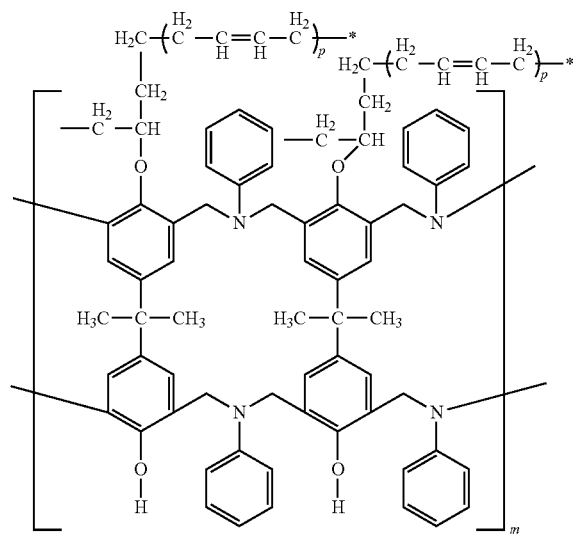

Formula (2)

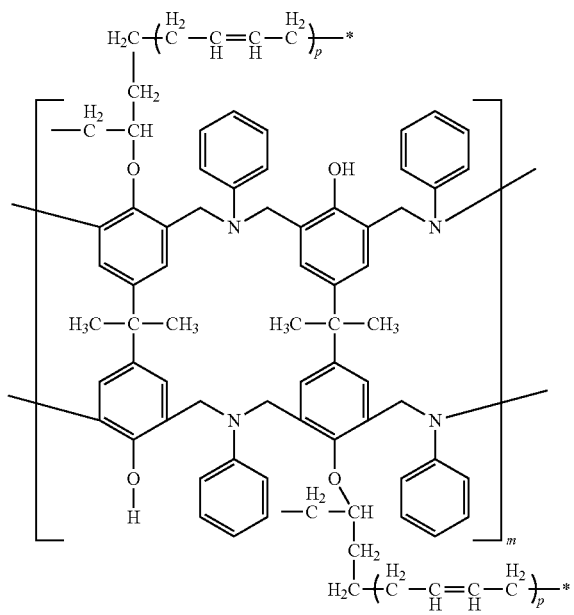

Formula (3)

Formula (4)
Formula (5)
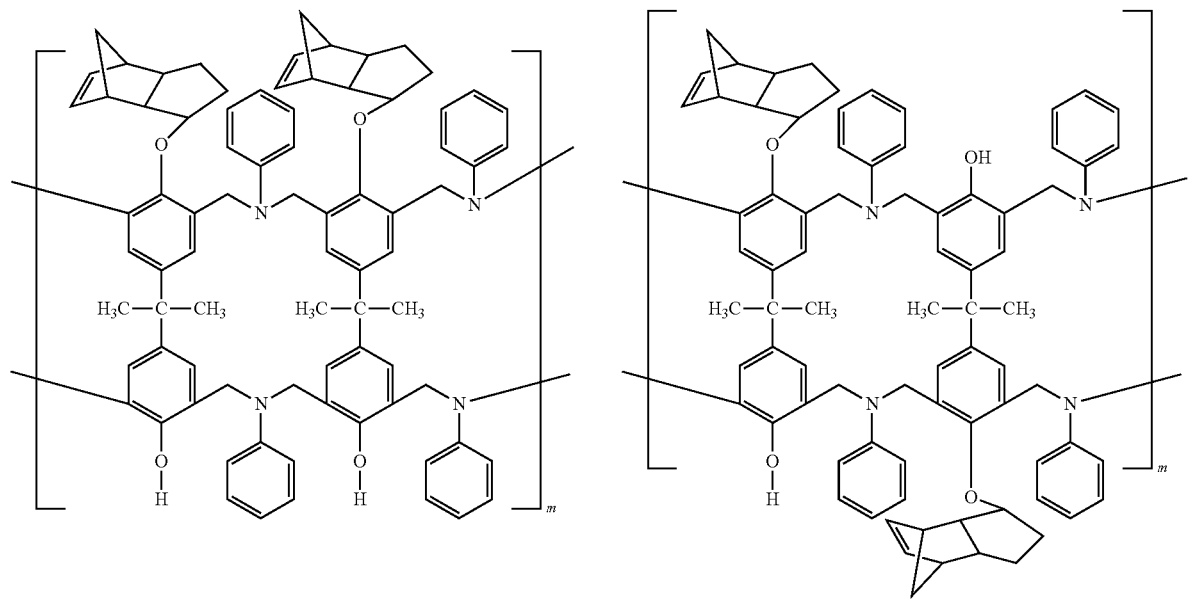
Formula (6)
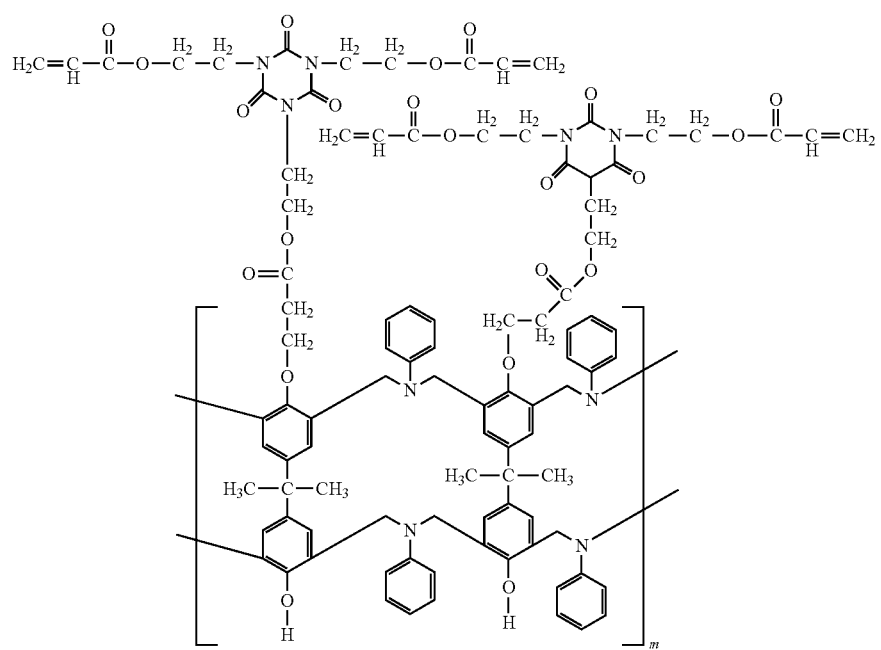

-continued
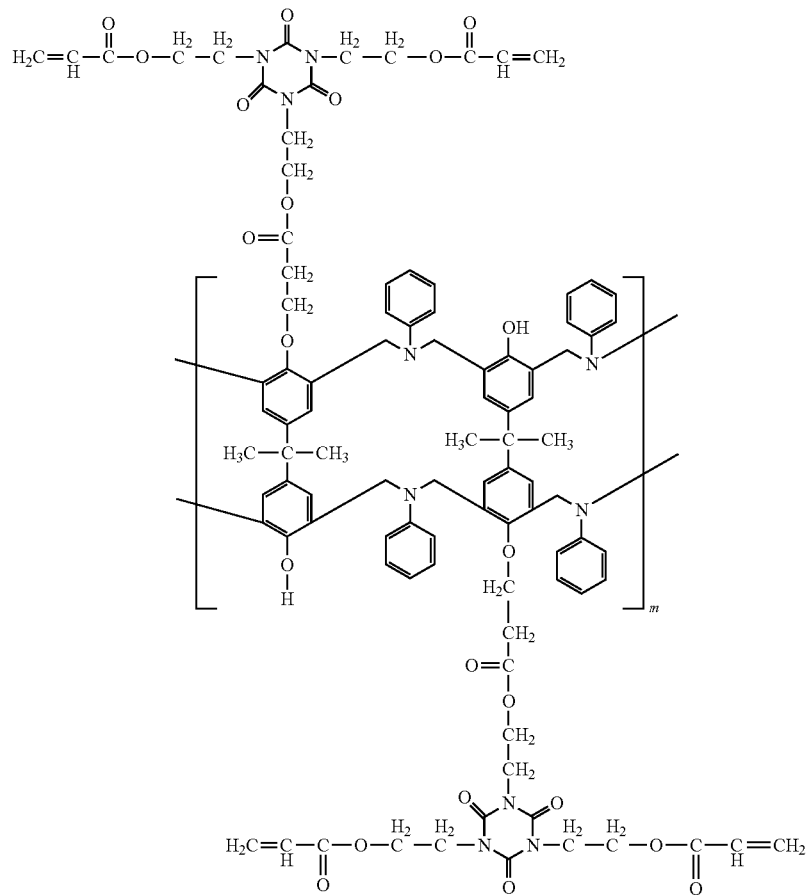
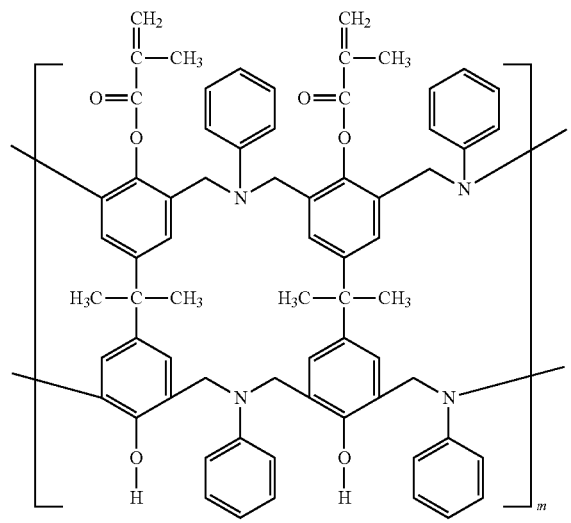
Formula (8)
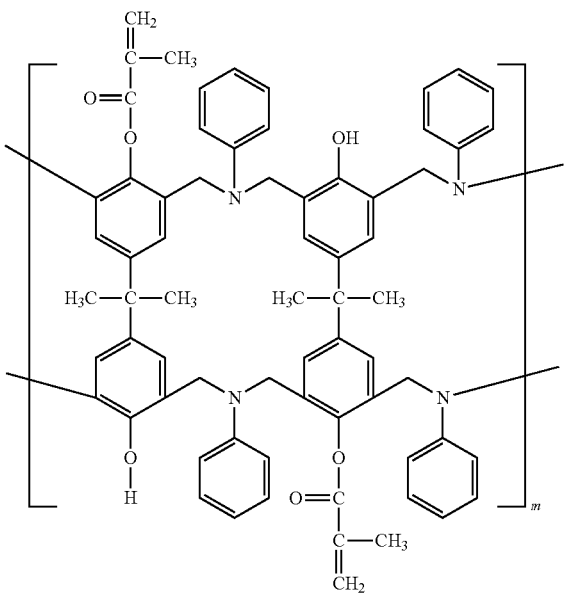
Formula (9)
wherein m is an integer of 1 to 10, preferably an integer of 1 to 3. p is an integer of 0 to 25, preferably an integer of 1 to 15, and more preferably an integer of 1 to 10.
Examples of the maleimide resin are not particularly limited and may comprise various maleimide resins known in the art to which this disclosure pertains; examples include 4,4'-diphenylmethane bismaleimide, polyphenylmethane maleimide, bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenylmaleimide, vinyl benzyl maleimide, maleimide resin containing aliphatic long chain structure, prepolymer of diallyl compound and maleimide resin, prepolymer of diamine and maleimide resin, prepolymer of multi-functional amine and maleimide resin, prepolymer of acid phenol compound and maleimide resin, or a combination thereof.

In addition to the prepolymer of crosslinking agent and benzoxazine resin and the maleimide resin, the resin composition may optionally further comprise polyphenylene ether resin (a.k.a. polyphenylene oxide resin), vinylbenzyl-dicyclopentadiene phenylene ether, cyanate ester resin, active ester, bis(vinylbenzyl) ether, 1,2-bis(vinylphenyl)ethane, divinylbenzene, triallyl isocyanurate, triallyl cyanurate, 1,2,4-trivinyl cyclohexane, diallyl bisphenol A, styrene, acrylate, polyolefin, epoxy resin, phenolic resin, styrene maleic anhydride, amine curing agent, polyamide, polyimide, or a combination thereof. These components should be construed as including their modifications.

In addition to the prepolymer of crosslinking agent and benzoxazine resin and the maleimide resin, the resin composition may optionally further comprise flame retardant, inorganic filler, curing accelerator, solvent, silane coupling agent, surfactant, coloring agent, toughening agent or a combination thereof.

The resin compositions of various embodiments may be useful for making different articles, including but not limited to a prepreg, a resin film, a resin-coated copper, a laminate or a printed circuit board.

In a preferred embodiment, articles made from the resin composition disclosed herein have one, more or all of the following properties:
  a dissipation factor at 10 GHz as measured by reference to JIS C2565 of less than or equal to 0.0060, such as between 0.0042 and 0.0060;
  a copper foil peeling strength as measured by using a tensile strength tester by reference to IPC-TM-650 2.4.8 of greater than or equal to 4.0 lb/in, such as between 4.0 lb/in and 5.0 lb/in or between 4.1 lb/in and 4.7 lb/in;
  a T288 thermal resistance as measured by reference to IPC-TM-650 2.4.24.1 of greater than 130 minutes;
  a ten-layer board T300 thermal resistance as measured by reference to IPC-TM-650 2.4.24.1 of greater than 130 minutes; and
  a reflow shrinkage as measured by reference to IPC-TM-650 2.4.39 of less than or equal to 150 ppm, such as between 64 ppm and 145 ppm.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "a," "an" or any similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, the term "comprises," "comprising," "includes," "including," "has," "having" or any other variant thereof is construed as an open-ended transitional phrase intended to cover a non-exclusive inclusion. For example, a composition or manufacture that comprises a list of elements is not necessarily limited to only those elements but may include other elements not expressly listed or inherent to such composition or manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "has," "having" or any other variant thereof, it is understood that close-ended transitional phrases such as "consisting of," "composed by" and "remainder being" and partially open-ended transitional phrases such as "consisting essentially of," "primarily consisting of," "mainly consisting of," "primarily containing," "composed essentially of," "essentially having," etc. are also disclosed and included.

In this disclosure, features and conditions such as values, numbers, contents, amounts or concentrations presented as a numerical range or a percentage range are merely for convenience and brevity. Therefore, a numerical range or a percentage range should be interpreted as encompassing and specifically disclosing all possible subranges and individual numerals or values therein, including integers and fractions, particularly all integers therein. For example, a range of "1.0 to 8.0" or "between 1.0 and 8.0" should be understood as explicitly disclosing all subranges such as 1.0 to 8.0, 1.0 to 7.0, 2.0 to 8.0, 2.0 to 6.0, 3.0 to 6.0, 4.0 to 8.0, 3.0 to 8.0 and so on and encompassing the end points of the ranges, particularly subranges defined by integers, as well as disclosing all individual values such as 1.0, 2.0, 3.0, 4.0, 5.0, 6.0, 7.0 and 8.0. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, when X is described as being "selected from a group consisting of $X_1$, $X_2$ and $X_3$," and Y is described as being "selected from a group consisting of $Y_1$, $Y_2$ and $Y_3$," the disclosure encompasses any combination of X is $X_1$ and/or $X_2$ and/or $X_3$ and Y is $Y_1$ and/or $Y_2$ and/or $Y_3$.

As used herein, "or a combination thereof" means "or any combination thereof", and "any" means "any one", vice versa.

Unless otherwise specified, according to the present disclosure, a compound refers to a chemical substance formed by two or more elements bonded with chemical bonds and may be present as a monomer, a polymer, etc., but not limited thereto. Monomer may participate polymerization or prepolymerization reaction to produce a polymer. In the present disclosure, a compound is not only limited to a single chemical substance, but also can be construed as the same kind of chemical substance with the same composition or the same property. For example, the term "olefin" as used herein is construed as comprising olefin monomer and olefin polymer, as well as comprising olefin homopolymer, olefin oligomer, olefin prepolymer and olefin copolymer.

Unless otherwise specified, the term "resin" of the present disclosure is construed as comprising monomer, polymer or a combination thereof, but not limited thereto. A polymer refers to a chemical substance formed by one, two or more compounds via polymerization and may comprise a homopolymer, a copolymer, a prepolymer, etc., but not limited thereto. In addition, the term "polymer" includes but is not limited to an oligomer. An oligomer refers to a polymer with 2-20, typically 2-5, repeating units. Unless otherwise specified, the term "resin" of the present disclosure is construed as comprising a monomer, a polymer, a combination of monomers, a combination of polymers, and a combination of monomer(s) and polymer(s). For example, in the present disclosure, the term "benzoxazine resin" is construed to encompass a benzoxazine monomer, a benzoxazine polymer, a combination of benzoxazine monomers, a combination of benzoxazine polymers, and a combination of benzoxazine monomer(s) and benzoxazine polymer(s). Similarly, in the present disclosure, the term "maleimide resin" is construed to encompass a maleimide monomer, a maleimide polymer, a combination of maleimide monomers, a combination of maleimide polymers, and a combination of maleimide monomer(s) and maleimide polymer(s).

Unless otherwise specified, a prepolymer as used herein refers to a chemical substance formed by different compounds, by a compound and a resin, or by different resins via prepolymerization. According to the present disclosure, a prepolymer of crosslinking agent and benzoxazine resin refers to a product with an intermediate molecular weight obtained by subjecting the crosslinking agent (compound) and benzoxazine resin to a certain degree of reaction, the intermediate molecular weight being greater than the molecular weight of the crosslinking agent (compound) and benzoxazine resin before reaction but less than the molecular weight of the final product obtained from a complete reaction; in addition, the prepolymer contains a reactive functional group capable of participating further polymerization to obtain the final high molecular weight product which has been fully crosslinked or cured. According to the present disclosure, prepolymerization reaction refers to the process of reacting crosslinking agent (compound) and benzoxazine resin to obtain a prepolymer.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from homopolymerizing a resin, a product derived from copolymerizing a resin and other resins, etc.

Unless otherwise specified, according to the present disclosure, when the term acrylate is expressed as (meth)acrylate, it is intended to comprise both situations of containing and not containing a methyl group; for example, cyclohexane dimethanol di(meth)acrylate can be construed as including cyclohexane dimethanol diacrylate, cyclohexane dimethanol dimethacrylate or both.

It should be understood that all features disclosed herein may be combined in any way to constitute the solution of the present disclosure, as long as there is no conflict present in the combination of these features.

Examples and embodiments are described in detail below. It will be understood that these examples and embodiments are exemplary only and are not intended to limit the scope and use of the present disclosure. Unless otherwise specified, processes, reagents and conditions described in the examples are those known in the art.

For example, the present disclosure provides a resin composition, comprising:
(A) 10 parts by weight to 45 parts by weight of a prepolymer of crosslinking agent and benzoxazine resin; and
(B) 30 parts by weight to 70 parts by weight of a maleimide resin.

For example, the resin composition may comprise 10 parts by weight to 20 parts by weight or 20 parts by weight to 45 parts by weight of the prepolymer of crosslinking agent and benzoxazine resin.

For example, the resin composition may comprise 30 parts by weight to 50 parts by weight or 50 parts by weight to 70 parts by weight of the maleimide resin.

The prepolymer of crosslinking agent and benzoxazine resin refers to a product of a prepolymerization reaction of the crosslinking agent and the benzoxazine resin under proper conditions.

During the prepolymerization reaction of the crosslinking agent and the benzoxazine resin, first the benzoxazine resin is subject to a ring opening reaction, such as by heating the benzoxazine resin to induce ring opening; next, the crosslinking agent and the ring-opened benzoxazine resin are subject to polymerization (i.e., the crosslinking agent is reacted with the hydroxyl group of the benzoxazine resin formed after ring opening), so as to obtain the prepolymer of crosslinking agent and benzoxazine resin.

Optionally, during the ring opening reaction of the benzoxazine resin, a catalyst is added, such as but not limited to aluminum chloride.

Optionally, during the polymerization of the crosslinking agent and the ring-opened benzoxazine resin, a catalyst is added, such as but not limited to 1-methyl-3-n-butylimidazolium fluoroborate.

Optionally, during the polymerization of the crosslinking agent and the ring-opened benzoxazine resin, an alkaline solution is added, such as but not limited to sodium hydroxide solution, potassium hydroxide solution, triethylamine and potassium tert-butoxide.

Examples of the aforesaid crosslinking agent are not particularly limited, preferably comprising an olefin containing two or more unsaturated bonds per molecule, an acrylate containing two or more unsaturated bonds per molecule, an unsaturated bond-containing acyl chloride, or a combination thereof.

The prepolymer of crosslinking agent and benzoxazine resin disclosed herein, in comparison with a conventional benzoxazine resin, is more compatible with the maleimide resin because some or all of the hydroxyl groups are consumed during the prepolymerization and multiple reactive unsaturated bond-containing groups are introduced to its structure; hence, it may achieve low reflow shrinkage, high ten-layer board T300 thermal resistance and lower dissipation factor.

In the prepolymerization process, the weight ratio of the crosslinking agent to the benzoxazine resin is 1.0:9.0 to 2.0:1.0. In some embodiments, the weight ratio of the crosslinking agent to the benzoxazine resin may be for example 1.0:9.0, 1.0:8.0, 1.0:7.0, 1.0:6.0, 1.0:5.0, 1.0:4.0, 1.0:3.0, 1.0:2.0, 1.0:1.0, 1.5:1.0, 1.5:2.0, 1.5:3.0, 1.5:4.0, 1.5:5.0, 1.5:6.0, 1.5:7.0, 1.5:8.0, 1.5:9.0 or 2.0:1.0, but not limited thereto.

The prepolymer of crosslinking agent and benzoxazine resin comprises a prepolymer of olefin and benzoxazine resin, a prepolymer of acrylate and benzoxazine resin, a prepolymer of unsaturated bond-containing acyl chloride and benzoxazine resin, or a combination thereof.

Examples of the olefin are not particularly limited and may comprise, but not limited to, various olefin monomers, oligomers, polymers, prepolymers, homopolymers or copolymers containing two or more unsaturated bonds per molecule known in the art to which this disclosure pertains; examples include but are not limited to styrene-butadiene-divinylbenzene terpolymer, styrene-butadiene-maleic anhydride terpolymer, vinyl-polybutadiene-urethane oligomer, styrene-butadiene copolymer, styrene-isoprene copolymer, maleic anhydride-butadiene copolymer, polybutadiene, polyisoprene, butadiene, dicyclopentadiene, bis(vinylbenzyl)ether, 1,2-bis(vinylphenyl) ethane, divinylbenzene, triallyl isocyanurate, triallyl cyanurate, 1,2,4-trivinyl cyclohexane, or a combination thereof.

During the prepolymerization of olefin and benzoxazine resin, some unsaturated bonds of the olefin and hydroxyl groups of the benzoxazine resin formed after ring opening are subject to an etherization reaction in the presence of a catalyst, such that some or all of the hydroxyl groups are consumed, thereby obtaining the prepolymer of olefin and benzoxazine resin. Because some unsaturated bonds of the olefin do not participate the prepolymerization process, these unsaturated bonds may serve as remaining reactive groups which have the potential of crosslinking with other unsaturated bond-containing resins (such as but not limited to maleimide resin) in the resin composition, thereby further improving the compatibility of the resin system. Therefore, the resin composition of the present disclosure may achieve low reflow shrinkage, high ten-layer board T300 thermal resistance and lower dissipation factor.

Examples of the acrylate are not particularly limited and may comprise, but not limited to, various bifunctional acrylates, trifunctional acrylates and multi-functional acrylates containing two or more unsaturated bonds per molecule known in the art to which this disclosure pertains; examples include but are not limited to cyclohexane dimethanol di(meth)acrylate, ethylene glycol di(meth)acrylate, 1,4-butylene glycol di(meth)acrylate, ethoxylated bisphenol A di(meth)acrylate, tricyclodecane di(meth) acrylate, trimethylolpropane tri(meth)acrylate, [(octahydro-4,7-methano-1H-indene-5,6-diyl)bis(methylene)] di(meth)acrylate, tris (2-hydroxyethyl) isocyanurate tri(meth)acrylate, trimethylolpropane tri(meth)acrylate, ethoxylated trimethylolpropane tri(meth)acrylate, pentaerythritol tetra(meth)acrylate, or a combination thereof.

For example, the acrylate may be available from Sartomer under the tradenames CD406, CD595, SR205 NS, SR206 NS, SR214, SR231 NS, SR238 NS, SR239 NS, SR252, SR259, SR262, SR268, SR297, SR297 F NS, SR306 NS, SR344, SR348 L NS, SR348 OP NS, SR349 NS, SR490 NS, SR508 NS, SR601 NS, SR602NS, SR603 OP, SR610 NS, SR644, SR833S, SR9003 NS, SR350 NS, SR351 NS, SR368 D NS, SR368 NS, SR415, SR444 NS, SR454NS, SR502 NS, SR517 NS, SR9020 NS, SR9035, SR9051 NS, SR9053, DPHA, SR295 NS, SR355 HV NS, SR355 NS, SR494 NS, and TFN series products.

During the prepolymerization of acrylate and benzoxazine resin, some unsaturated bonds of the acrylate and hydroxyl groups of the benzoxazine resin formed after ring opening are subject to an etherization reaction in the presence of a catalyst, such that some or all of the hydroxyl groups are consumed, thereby obtaining the prepolymer of acrylate and benzoxazine resin. Because some unsaturated bonds of the acrylate do not participate the prepolymerization process, these unsaturated bonds may serve as remaining reactive groups which have the potential of crosslinking with other unsaturated bond-containing resins (such as but not limited to maleimide resin) in the resin composition, thereby further improving the compatibility of the resin system. Therefore, the resin composition of the present disclosure may achieve low reflow shrinkage, high ten-layer board T300 thermal resistance and lower dissipation factor.

Examples of the unsaturated bond-containing acyl chloride are not particularly limited and may comprise various acyl chlorides containing one or more unsaturated bonds per molecule known in the art to which this disclosure pertains; examples include but are not limited to methacryloyl chloride, cinnamyl chloride, crotonyl chloride, trans-8-methyl-6-nonanoyl chloride, 10-undecenoyl chloride, or a combination thereof.

During the prepolymerization of unsaturated bond-containing acyl chloride and benzoxazine resin, the chloride atoms of the unsaturated bond-containing acyl chloride and hydroxyl groups of the benzoxazine resin formed after ring opening are subject to a halogen substitution reaction in the presence of an alkaline solution to introduce the unsaturated bond-containing acyl group to the benzoxazine resin structure, such that some or all of the hydroxyl groups are consumed, thereby obtaining the prepolymer of unsaturated bond-containing acyl chloride and benzoxazine resin. Because the unsaturated bond of the unsaturated bond-containing acyl chloride does not participate the prepolymerization process, the unsaturated bond may serve as a remaining reactive group which has the potential of crosslinking with other unsaturated bond-containing resins (such as but not limited to maleimide resin) in the resin composition, thereby further improving the compatibility of the resin system. Therefore, the resin composition of the present disclosure may achieve low reflow shrinkage, high ten-layer board T300 thermal resistance and lower dissipation factor.

The unsaturated bond described herein, unless otherwise specified, refers to a reactive unsaturated bond, such as but not limited to an unsaturated double bond with the potential of being crosslinked with other functional groups, such as an unsaturated carbon-carbon double bond with the potential of being crosslinked with other functional groups, but not limited thereto.

Examples of the benzoxazine resin are not particularly limited and may comprise various benzoxazine resins known in the art to which this disclosure pertains; examples include but are not limited to bisphenol A benzoxazine resin, bisphenol F benzoxazine resin, phenolphthalein benzoxazine resin, dicyclopentadiene benzoxazine resin, phosphorus-containing benzoxazine resin, diamino benzoxazine resin, unsaturated bond-containing benzoxazine resin, or a combination thereof. The diamino benzoxazine resin may include oxydianiline benzoxazine resin, diamino bisphenol F benzoxazine resin, diamino diphenyl benzoxazine resin, or a combination thereof.

For example, the benzoxazine resin may be, but not limited to, LZ-8270, LZ-8280, LZ-8290 or LPY 11051 sold by Huntsman, or HFB-2006M sold by Showa High Polymer.

Preferably, the prepolymer of crosslinking agent and benzoxazine resin described herein comprises a prepolymer of polybutadiene and benzoxazine resin, a prepolymer of dicyclopentadiene and benzoxazine resin, a prepolymer of tris(2-hydroxyethyl) isocyanurate triacrylate and benzoxazine resin, a prepolymer of methacryloyl chloride and benzoxazine resin, or a combination thereof.

Preferably, the prepolymer of crosslinking agent and benzoxazine resin described herein comprises a structure of Formula (1) below:

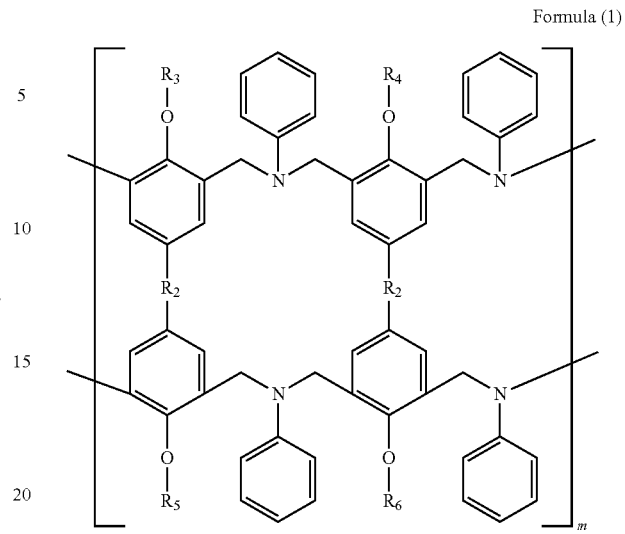

Formula (1)

wherein $R_2$ is a covalent bond, —$CH_2$—, —$CH(CH_3)$— or —$C(CH_3)_2$—; preferably, $R_2$ is —$C(CH_3)_2$—. $R_3$, $R_4$, $R_5$ and $R_6$ each independently represent hydrogen or an unsaturated bond-containing group, and $R_3$, $R_4$, $R_5$ and $R_6$ are not hydrogen at the same time; for example, $R_3$ and $R_4$ represent an unsaturated bond-containing group, and $R_5$ and $R_6$ represent hydrogen; or $R_3$ and $R_6$ represent an unsaturated bond-containing group, and $R_4$ and $R_5$ represent hydrogen; or $R_3$ and $R_5$ represent an unsaturated bond-containing group, and $R_4$ and $R_6$ represent hydrogen; or $R_3$, $R_4$, $R_5$, and $R_6$ represent an unsaturated bond-containing group; or $R_3$, $R_4$ and $R_5$ represent an unsaturated bond-containing group, and $R_6$ represents hydrogen. m is an integer of 1 to 10, preferably an integer of 1 to 3.

More preferably, the prepolymer of crosslinking agent and benzoxazine resin comprises a structure of any one of Formula (2) to Formula (9) below or a combination thereof:

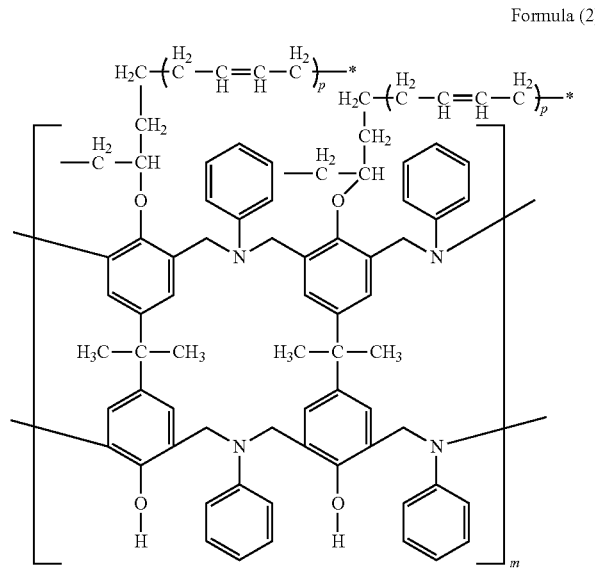

Formula (2)

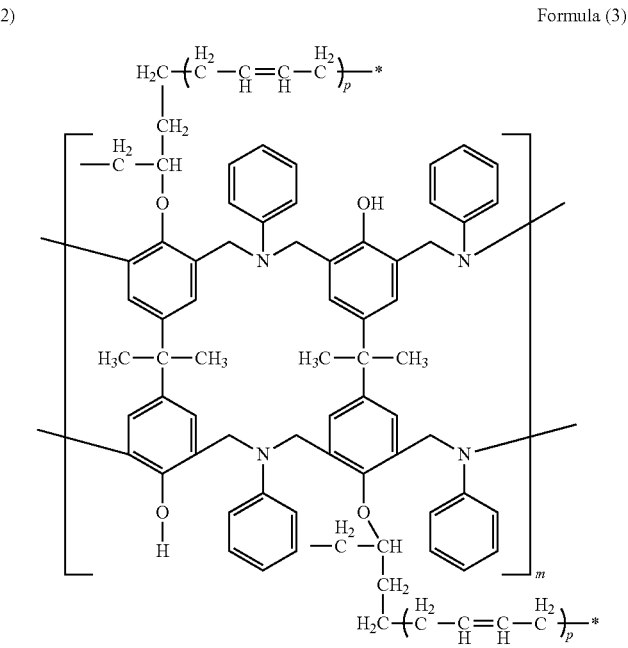

Formula (3)

Formula (4)
Formula (5)
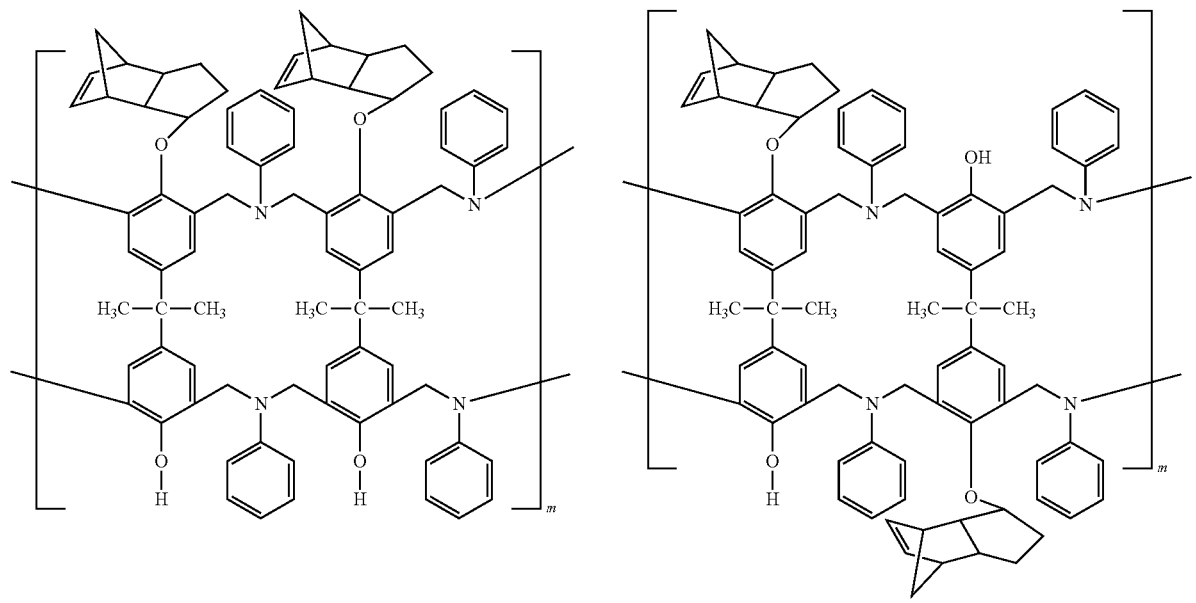
Formula (6)
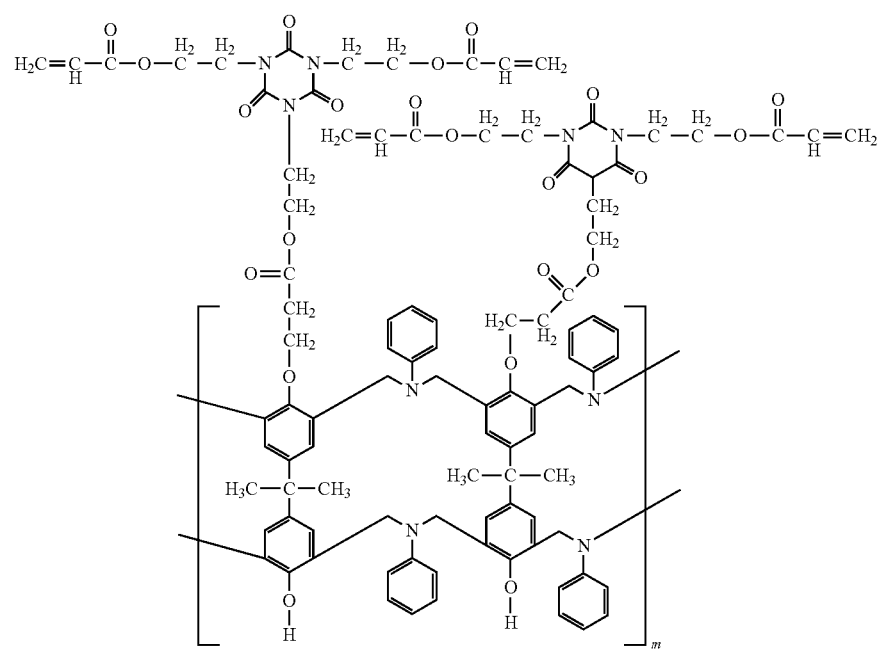

-continued
Formula (7)
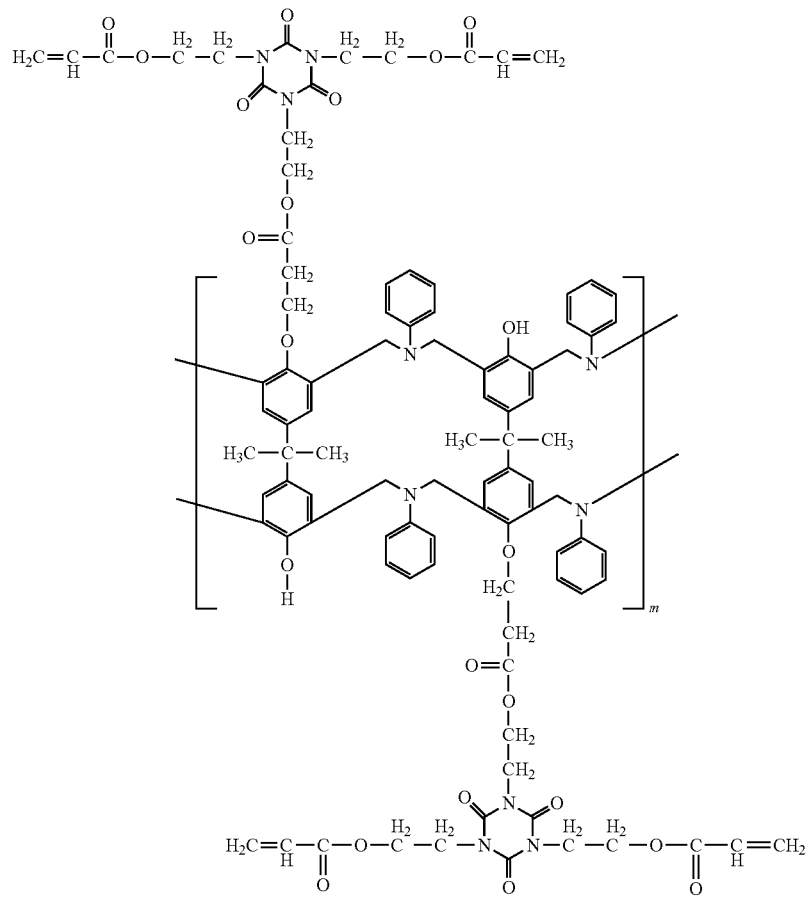
Formula (8)
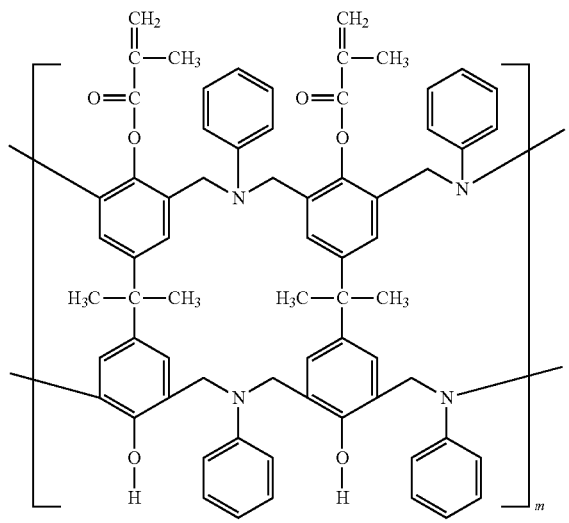
Formula (9)
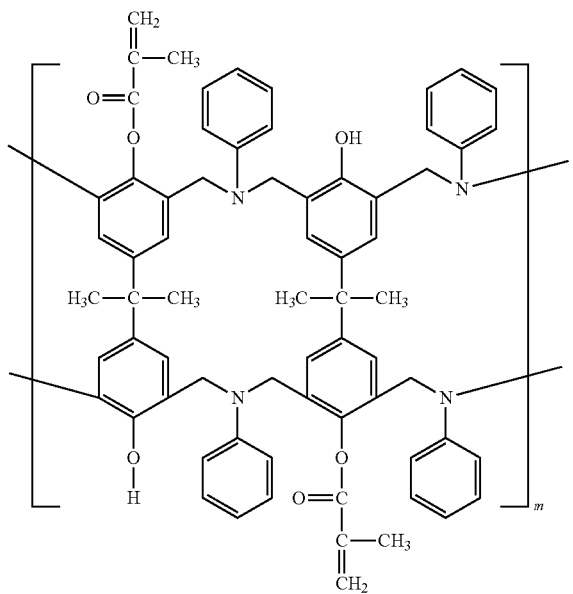
wherein m is an integer of 1 to 10, preferably an integer of 1 to 3. p is an integer of 0 to 25, preferably an integer of 1 to 15, and more preferably an integer of 1 to 10.
The maleimide resin of the present disclosure comprises a monomer containing at least one maleimide group, its oligomer, its polymer, its prepolymer, or a combination thereof. Unless otherwise specified, the maleimide resin used in the present disclosure is not particularly limited and may include any one or more maleimide resins useful for preparing a prepreg, a resin film, a resin-coated copper, a laminate or a printed circuit board. In some embodiments, the maleimide resin may comprise 4,4'-diphenylmethane bismaleimide, polyphenylmethane maleimide (a.k.a. oligomer of phenylmethane maleimide), bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenylmaleimide, vinyl benzyl maleimide (VBM), maleimide resin containing aliphatic long chain structure, prepolymer of diallyl compound and maleimide resin, prepolymer of diamine and maleimide resin, prepolymer of multi-functional amine and maleimide resin, prepolymer of acid phenol compound and maleimide resin, or a combination thereof.

For example, the maleimide resin may include products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000 and BMI-7000H available from Daiwakasei Industry Co., Ltd., or products such as BMI-70 and BMI-80 available from K. I Chemical Industry Co., Ltd.

For example, the maleimide resin containing aliphatic long-chain structure may include products such as BMI-689, BMI-1400, BMI-1500, BMI-1700, BMI-2500, BMI-3000, BMI-5000 and BMI-6000 available from Designer Molecules Inc.

In addition to the prepolymer of crosslinking agent and benzoxazine resin and the maleimide resin, the resin composition may optionally further comprise polyphenylene ether resin, vinylbenzyl-dicyclopentadiene phenylene ether, cyanate ester resin, active ester, bis(vinylbenzyl)ether, 1,2-bis(vinylphenyl)ethane, divinylbenzene, triallyl isocyanurate, triallyl cyanurate, 1,2,4-trivinyl cyclohexane, diallyl bisphenol A, styrene, acrylate, polyolefin, epoxy resin, phenolic resin, styrene maleic anhydride, amine curing agent, polyamide, polyimide, or a combination thereof. These components should be construed as including their modifications.

The modifications described herein may comprise, but not limited to, a product derived from a resin with its reactive functional group modified, a product derived from prepolymerization of a resin and other resins, a product derived from a crosslinking reaction of a resin and other resins, a product derived from homopolymerizing a resin, a product derived from copolymerizing a resin and other resins, etc.

Unless otherwise specified, relative to a total of 1 part by weight to 100 parts by weight of the combination of the prepolymer of crosslinking agent and benzoxazine resin and the maleimide resin, any resin described above may range from 1 part by weight to 100 parts by weight, and the ratio therebetween can be adjusted according to the need.

For example, the polyphenylene ether resin used herein is not particularly limited and may comprise various polyphenylene ether resins known in the art to which this disclosure pertains, such as a hydroxyl-terminated polyphenylene ether, an unsaturated bond-containing polyphenylene ether, or a combination thereof. Preferably, the polyphenylene ether resin comprises an unsaturated bond-containing polyphenylene ether. The unsaturated bond-containing polyphenylene ether suitable for the present disclosure is not particularly limited and may comprise any one or more commercially available products, self-prepared products, or a combination thereof. Generally, the unsaturated bond-containing polyphenylene ether suitable for the present disclosure may have a structure of Formula (10):

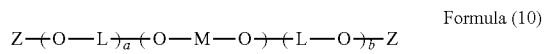

Formula (10)

wherein a and b are individually a positive integer of 1 to 30, preferably a positive integer of 1 to 10, and more preferably a positive integer of 1 to 5;
—(O—M—O)— has a structure of Formula (11) or Formula (12):

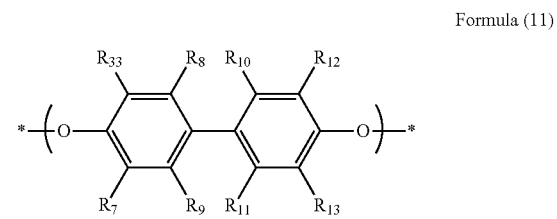

Formula (11)

Formula (12)

L has a structure of Formula (13):

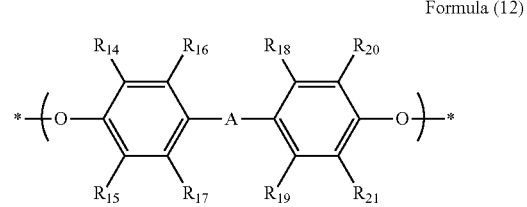

Formula (13)

wherein $R_{33}$, $R_7$, $R_{12}$ and $R_{13}$ are the same or different and are individually a halogen atom, a C1-C6 alkyl group or a phenyl group; $R_8$, $R_9$, $R_{10}$ and $R_{11}$ are the same or different and are individually a hydrogen atom, a halogen atom, a C1-C6 alkyl group or a phenyl group; in some embodiments, $R_{33}$, $R_7$, $R_8$, $R_{11}$, $R_{12}$ and $R_{13}$ are individually a methyl group;

$R_{14}$, $R_{15}$, $R_{16}$, $R_{17}$, $R_{18}$, $R_{19}$, $R_{20}$ and $R_{21}$ are the same or different and are individually a halogen atom, a C1-C6 alkyl group, a phenyl group or a hydrogen atom; in some embodiments, $R_{14}$, $R_{15}$, $R_{20}$ and $R_{21}$ are individually a methyl group;

A is a C1-C20 straight chain hydrocarbyl group, a C1-C20 branched chain hydrocarbyl group (e.g., alkyl group) or a C3-C20 cyclic hydrocarbyl group (e.g., cycloalkyl group), preferably —CH$_2$— or —C(CH$_3$)$_2$—;

$R_{22}$, $R_{23}$, $R_{24}$ and $R_{25}$ are the same or different and are individually a hydrogen atom, a halogen atom, a C1-C6 alkyl group or a phenyl group;

Z has a structure of Formula (14), Formula (15) or Formula (16):

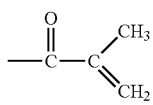
Formula (14)

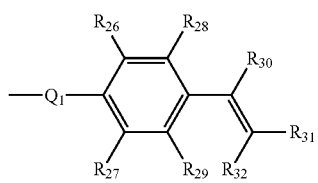
Formula (15)

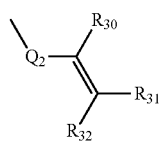
Formula (16)

wherein $R_{31}$ and $R_{32}$ are a hydrogen atom, $R_{26}$, $R_{27}$, $R_{28}$, $R_{29}$ and $R_{30}$ are the same or different and are individually a hydrogen atom, a halogen atom, an alkyl group or a haloalkyl group, wherein the alkyl group or haloalkyl group preferably is a C1-C6 alkyl group or a halogen-substituted C1-C6 alkyl group; $Q_1$ and $Q_2$ are individually an organic group with at least one carbon atom, wherein the organic group optionally comprises one or more of a hydrogen atom, an oxygen atom, a nitrogen atom, a sulfur atom and a halogen atom. In some embodiments, $Q_1$ and $Q_2$ are individually a methylene group (—$CH_2$—). In some embodiments, $R_{26}$ to $R_{30}$ are individually a hydrogen atom or a C1-C6 alkyl group.

In some embodiments, the unsaturated bond-containing polyphenylene ether may include: vinylbenzyl-terminated polyphenylene ether (e.g., OPE-2st available from Mitsubishi Gas Chemical Co., Inc.), methacrylate-terminated polyphenylene ether (e.g., SA-9000 available from SABIC), vinylbenzyl-terminated bisphenol A polyphenylene ether, vinyl-containing chain-extended polyphenylene ether, or a combination thereof. The vinyl-containing chain-extended polyphenylene ether may include various polyphenylene ethers disclosed in the US Patent Application Publication No. 2016/0185904 A1, all of which are incorporated herein by reference in their entirety.

For example, the vinylbenzyl-dicyclopentadiene phenylene ether is not particularly limited and may comprise a structure of Formula (17):

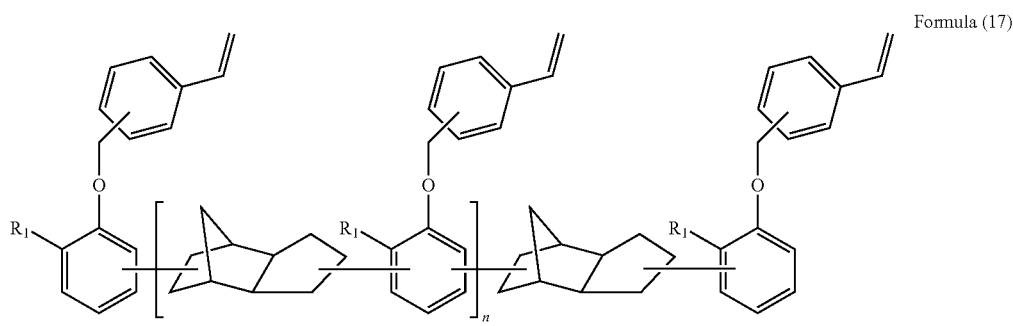
Formula (17)

wherein each $R_1$ independently represents hydrogen, a C1-C20 straight chain alkyl, a C1-C20 cycloalkyl or a C1-C20 aryl group; and n is an integer of 1 to 10. Preferably, $R_1$ is hydrogen or methyl group, and n is an integer of 1 to 3.

The vinylbenzyl-dicyclopentadiene phenylene ether of Formula (17) may be obtained by the reaction of hydroxyl groups on the compound of Formula (18) with a vinylbenzyl halide.

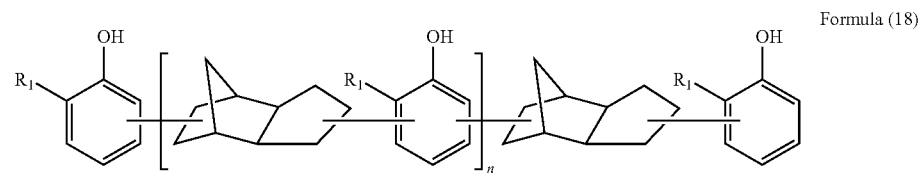
Formula (18)

wherein each $R_1$ independently represents hydrogen, a C1-C20 straight chain alkyl, a C1-C20 cycloalkyl or a C1-C20 aryl group; and n is an integer of 1 to 10. Preferably, $R_1$ is hydrogen or methyl group, and n is an integer of 1 to 3.

Optionally, during the reaction of the compound of Formula (18) with a vinylbenzyl halide, a phase transfer catalyst is added, such as but not limited to tetrabutylammonium bromide or tetrabutylammonium iodide.

Optionally, during the reaction of the compound of Formula (18) with a vinylbenzyl halide, an alkaline solution is added, such as but not limited to sodium hydroxide solution, potassium hydroxide solution, triethylamine or potassium tert-butoxide.

Optionally, during the reaction of the compound of Formula (18) with a vinylbenzyl halide, a proper amount of solvent is added, such as but not limited to ketone (e.g., acetone or methyl ethyl ketone), toluene or a combination thereof.

According to the preparation process described above, various products may be obtained by replacing different vinylbenzyl halides; for example, the vinylbenzyl halide may comprise 4-chloro-methyl styrene, 3-chloro-methyl styrene, 2-chloro-methyl styrene or a combination thereof.

In some embodiments, the preparation of the vinylbenzyl-dicyclopentadiene phenylene ether preferably involves reacting a hydroxyl-containing dicyclopentadiene phenol resin with 4-chloro-methyl styrene in the presence of a toluene solvent, more preferably in the presence of sodium hydroxide and tetrabutylammonium iodide, to produce a vinylbenzyl-dicyclopentadiene phenylene ether. In addition, the preparation of the vinylbenzyl-dicyclopentadiene phenylene ether preferably involves using methanol to wash off the impurities after the reaction; for example, after the reaction, the halogen-containing substance contained in the reactant will produce sodium halide (e.g., sodium chloride) which may be removed by methanol, such that the vinylbenzyl-dicyclopentadiene phenylene ether product is present as a dark brown viscous liquid state resin.

The cyanate ester resin suitable for the present disclosure is not particularly limited and may be any compound with an Ar—O—C≡N structure, wherein Ar represents a substituted or unsubstituted aromatic group. Examples include but are not limited to novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin or fluorene cyanate ester resin. The novolac cyanate ester resin may be selected from bisphenol A novolac cyanate ester resin, bisphenol F novolac cyanate ester resin, phenol novolac cyanate ester resin and a combination thereof. For example, the cyanate ester resin may be available under the tradename primaset PT-15, PT-30S, PT-60S, BA-200, BA-230S, BA-3000S, BTP-2500, BTP-6020S, DT-4000, DT-7000, ULL-950S, HTL-300, CE-320, LVT-50 or LeCy sold by Lonza.

The active ester suitable for the present disclosure may be any active polyester resins known in the field to which this disclosure pertains, including but not limited to various commercially available active polyester resin products. Examples include, but not limited to, HPC-8000 and HPC-8150 available from D. I. C. Corporation.

The bis(vinylbenzyl)ether, 1,2-bis(vinylphenyl)ethane, divinylbenzene, triallyl isocyanurate, triallyl cyanurate, 1,2,4-trivinyl cyclohexane, diallyl bisphenol A and styrene suitable for the present disclosure are not particularly limited and may comprise various commercially available products.

The acrylate suitable for the present disclosure is not particularly limited, examples including the acrylate comprising two or more unsaturated bonds per molecule described above and various commercially available monofunctional acrylates.

The polyolefin suitable for the present disclosure is not particularly limited and may comprise any one or more commercially available products, self-prepared products or a combination thereof. Examples include but are not limited to styrene-butadiene-divinylbenzene terpolymer, hydrogenated styrene-butadiene-divinylbenzene terpolymer, styrene-butadiene-maleic anhydride terpolymer, hydrogenated styrene-butadiene-maleic anhydride terpolymer, vinyl-polybutadiene-urethane oligomer, styrene-butadiene copolymer, hydrogenated styrene-butadiene copolymer, styrene-isoprene copolymer, hydrogenated styrene-isoprene copolymer, maleic anhydride-butadiene copolymer, polybutadiene (i.e., homopolymer of butadiene), or a combination thereof.

The epoxy resin suitable for the present disclosure may be any epoxy resins known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, isocyanate-modified epoxy resin, or a combination thereof. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin. The phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may be selected from DOPO-containing phenolic novolac epoxy resin, DOPO-containing cresol novolac epoxy resin, DOPO-containing bisphenol-A novolac epoxy resin, and a combination thereof; the DOPO-HQ epoxy resin may be selected from DOPO-HQ-containing phenolic novolac epoxy resin, DOPO-HQ-containing cresol novolac epoxy resin, DOPO-HQ-containing bisphenol-A novolac epoxy resin, and a combination thereof.

The phenolic resin suitable for the present disclosure may comprise, but not limited to, mono-functional, bifunctional or multifunctional phenolic resin, comprising phenolic resin of a resin composition conventionally useful for making prepregs, such as phenoxy resin, phenol novolac resin, etc.

For example, in the styrene maleic anhydride resin, the ratio of styrene (S) to maleic anhydride (MA) may be for example 1/1, 2/1, 3/1, 4/1, 6/1, 8/1 or 12/1, examples including styrene maleic anhydride resins such as SMA-1000, SMA-2000, SMA-3000, EF-30, EF-40, EF-60 and EF-80 available from Cray Valley, or styrene maleic anhydride copolymers such as C400, C500, C700 and C900 available from Polyscope, but not limited thereto.

The amine curing agent suitable for the present disclosure may include, but not limited to, diamino diphenyl sulfone, diamino diphenyl methane, diamino diphenyl ether, diamino diphenyl sulfide, dicyandiamide, or a combination of.

The polyamide suitable for the present disclosure may be any polyamide resins known in the field to which this disclosure pertains, including but not limited to various commercially available polyamide resin products.

The polyimide suitable for the present disclosure may be any polyimide resins known in the field to which this disclosure pertains, including but not limited to various commercially available polyimide resin products.

Moreover, in addition to the aforesaid components, the resin composition disclosed herein may optionally further comprise flame retardant, inorganic filler, curing accelerator, solvent, silane coupling agent, surfactant, coloring agent, toughening agent, or a combination thereof.

The flame retardant suitable for the present disclosure may be any one or more flame retardants useful for preparing a prepreg, a resin film, a resin-coated copper, a laminate or a printed circuit board, examples including but not limited to phosphorus-containing flame retardant, preferably comprising any one or a combination selected from the following group: ammonium polyphosphate, hydroquinone bis-(diphenyl phosphate), bisphenol A bis-(diphenylphosphate), tri(2-carboxyethyl) phosphine (TCEP), phosphoric acid tris (chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO and its derivatives (such as di-DOPO compounds) or resins, DPPO (diphenylphosphine oxide) and its derivatives (such as di-DPPO compounds) or resins, melamine cyanurate, tri-hydroxy ethyl isocyanurate and aluminum phosphinate (e.g., commercially available OP-930 and OP-935).

For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN), and a DOPO-containing epoxy resin, wherein DOPO-PN is a DOPO-containing phenol novolac resin, and DOPO-BPN may be a DOPO-containing bisphenol novolac resin, such as DOPO-BPAN (DOPO-bisphenol A novolac), DOPO-BPFN (DOPO-bisphenol F novolac) and DOPO-BPSN (DOPO-bisphenol S novolac).

Unless otherwise specified, relative to a total of 1 part by weight to 100 parts by weight of the combination of the prepolymer of crosslinking agent and benzoxazine resin and the maleimide resin, the flame retardant used in the present disclosure is not particularly limited, and may be used at an amount of 1 part by weight to 100 parts by weight.

The inorganic filler suitable for the present disclosure may be any one or more inorganic fillers useful for preparing a prepreg, a resin film, a resin-coated copper, a laminate or a printed circuit board, examples including but not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride and calcined kaolin. Moreover, the inorganic filler can be spherical, fibrous, plate-like, particulate, sheet-like or whisker-like and can be optionally pretreated by a silane coupling agent.

Unless otherwise specified, relative to a total of 1 part by weight to 100 parts by weight of the combination of the prepolymer of crosslinking agent and benzoxazine resin and the maleimide resin, the inorganic filler used in the present disclosure is not particularly limited, and may be used at an amount of 10 parts by weight to 300 parts by weight.

The curing accelerator suitable for the present disclosure may comprise a catalyst, such as a Lewis base or a Lewis acid. The Lewis base may comprise any one or a combination of imidazole, boron trifluoride-amine complex, ethyl-triphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylamino-pyridine (DMAP). The Lewis acid may comprise metal salt compounds, such as those of manganese, iron, cobalt, nickel, copper and zinc, such as zinc octanoate or cobalt octanoate. The curing accelerator encompasses curing initiator such as a peroxide capable of producing free radicals, and examples of the curing initiator may comprise, but not limited to: dibenzoyl peroxide (BPO), dicumyl peroxide, 2,5-dimethyl-2,5-di(t-butylperoxy)hexane, 2,5-dimethyl-2, 5-di(t-butylperoxy)-3-hexyne (25B), di-t-butyl peroxide, di(t-butylperoxyisopropyl)benzene, di(t-butylperoxy) phthalate, di(t-butylperoxy)isophthalate, t-butyl peroxybenzoate, 2,2-di(t-butylperoxy) butane, 2,2-di(t-butylperoxy) octane, 2,5-dimethyl-2,5-di(benzoylperoxy)hexane, lauroyl peroxide, t-hexyl peroxypivalate, dibutylperoxyisopropyl-benzene, bis(4-t-butyl cyclohexyl) peroxydicarbonate, or a combination thereof.

The purpose of adding solvent according to the present disclosure is to dissolve the components in the resin composition so as to change the solid content of the resin composition and to adjust the viscosity of the resin composition. For example, the solvent may comprise, but not limited to, methanol, ethanol, ethylene glycol monomethyl ether, acetone, butanone (i.e., methyl ethyl ketone), methyl isobutyl ketone, cyclohexanone, toluene, xylene, methoxy-ethyl acetate, ethoxyethyl acetate, propoxyethyl acetate, ethyl acetate, propylene glycol methyl ether, dimethyl formamide, dimethyl acetamide, N-methyl-pyrrolidone, or a mixture thereof.

The silane coupling agent suitable for the present disclosure may comprise silane (such as but not limited to siloxane), which may be further categorized according to the functional groups into amino silane, epoxide silane, vinyl silane, ester silane, hydroxyl silane, isocyanate silane, methacryloxy silane and acryloxy silane.

The purpose of surfactant used herein is to ensure uniform distribution of the inorganic filler in the resin composition.

The coloring agent suitable for the present disclosure may comprise, but not limited to, dye or pigment.

The purpose of toughening agent used herein is to improve the toughness of the resin composition. The toughening agent may comprise, but not limited to, rubber resin, carboxyl-terminated butadiene acrylonitrile rubber (CTBN rubber), core-shell rubber, or a combination thereof.

The resin compositions of various embodiments of the present disclosure may be processed by various methods into different articles, including but not limited to a prepreg, a resin film, a resin-coated copper, a laminate or a printed circuit board.

For example, the resin compositions of various embodiments may be used to make prepregs.

In one embodiment, the prepreg disclosed herein has a reinforcement material and a layered structure formed thereon, wherein the layered structure is made by heating the resin composition at high temperature to a semi-cured state (B-stage). Suitable baking temperature for making the prepreg may be for example 120° C. to 180° C. The reinforcement material may be any one of a fiber material, woven fabric, and non-woven fabric, and the woven fabric preferably comprises fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or Q-glass fiber fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

In one embodiment, by well mixing the resin composition to form a varnish, loading the varnish into an impregnation tank, impregnating a fiberglass fabric into the impregnation tank to adhere the resin composition onto the fiberglass fabric, and finally heating and baking the resin composition at a proper temperature to a semi-cured state, a prepreg may be obtained.

For example, the article made from the resin composition disclosed herein may be a resin film. The resin film is prepared by heating and baking the resin composition to a semi-cured state. For example, by selectively coating the resin composition on a liquid crystal polymer film, a polyethylene terephthalate film (PET film) or a polyimide film, followed by heating and baking at a proper temperature to a semi-cured state, a resin film may be obtained.

For example, the article made from the resin composition disclosed herein may also be a resin-coated copper (RCC). In one preparation process, the resin composition from each embodiment is coated on a copper foil to uniformly adhere the resin composition thereon, followed by heating and baking at a proper temperature to a semi-cured state to obtain the resin-coated copper.

For example, the resin composition of the present disclosure may be made into a laminate, which comprises at least two metal foils and an insulation layer disposed between the metal foils, wherein the insulation layer is made by curing the resin composition at high temperature and high pressure to the C-stage, a suitable curing temperature being for example between 190° C. and 220° C. and preferably between 200° C. and 210° C. and a suitable curing time being 90 to 180 minutes and preferably 120 to 150 minutes. The insulation layer may be obtained by curing the aforesaid prepreg or resin film. The metal foil may contain copper, aluminum, nickel, platinum, silver, gold or alloy thereof, such as a copper foil. In a preferred embodiment, the laminate is a copper-clad laminate.

In one embodiment, the laminate may be further processed by trace formation processes to provide a printed circuit board.

For example, a double-sided copper-clad laminate (such as product EM-827, available from Elite Material Co., Ltd.) with a thickness of 28 mil and having one-ounce HTE (high temperature elongation) copper foils may be used and subject to drilling and then electroplating, so as to form electrical conduction between the upper layer copper foil and the bottom layer copper foil. Then the upper layer copper foil and the bottom layer copper foil are etched to form inner layer circuits. Then brown oxidation and roughening were performed on the inner layer circuits to form uneven structures on the surface to increase roughness. Next, a vacuum lamination apparatus is used to laminate the assembly containing a copper foil, the prepreg, the inner layer circuit board, the prepreg and a copper foil stacked in said order by heating at 190 to 220° C. for 90 to 180 minutes to cure the insulation material of the prepregs. Next, black oxidation, drilling, copper plating and other known circuit board processes are performed on the outmost copper foils so as to obtain the printed circuit board.

In one or more embodiments, the resin composition of the present disclosure and various articles made therefrom may preferably have any one, more or all of the following properties.

In one embodiment, a copper foil peeling strength as measured by using a tensile strength tester by reference to IPC-TM-650 2.4.8 is greater than or equal to 4.0 lb/in, such as between 4.0 lb/in and 5.0 lb/in or between 4.1 lb/in and 4.7 lb/in.

In one embodiment, a T288 thermal resistance as measured by using a thermomechanical analyzer by reference to IPC-TM-650 2.4.24.1 is greater than 130 minutes.

In one embodiment, a ten-layer board T300 thermal resistance as measured by using a thermomechanical analyzer by reference to IPC-TM-650 2.4.24.1 is greater than 130 minutes.

In one embodiment, a reflow shrinkage as measured by reference to
IPC-TM-650 2.4.39 is less than or equal to 150 ppm, such as between 64 ppm and 145 ppm.

In one embodiment, a dissipation factor at 10 GHz as measured by reference to JIS C2565 is less than or equal to 0.0060, such as between 0.0042 and 0.0060.

In one embodiment, in a test of resin filling property in open area, no branch-like pattern is found in the open area by microscope observation.

Raw materials below were used to prepare the resin compositions of various Examples (Table 1 and Table 2) and Comparative Examples (Table 5 and Table 6) of the present disclosure and further fabricated to prepare test samples or articles.

The names of chemicals used in the Examples and Comparative Examples are as follows:
1. vinylbenzyl-dicyclopentadiene phenylene ether, prepared by the Applicant or purchased from Kolon.
2. prepolymer of polybutadiene and benzoxazine resin, prepared by the Applicant.
3. prepolymer of dicyclopentadiene and benzoxazine resin, prepared by the Applicant.
4. prepolymer of tris(2-hydroxyethyl) isocyanurate triacrylate and benzoxazine resin, prepared by the Applicant.
5. prepolymer of methacryloyl chloride and benzoxazine resin, prepared by the Applicant.
6. allyl-containing dicyclopentadiene benzoxazine resin, prepared by the Applicant or purchased from Kolon.
7. bisphenol A benzoxazine resin, LZ 8290, purchased from Huntsman Corporation.
8. dicyclopentadiene benzoxazine resin, prepared by the Applicant or purchased from Kolon.
9. polybutadiene, B-1000, purchased from Nippon Soda Co., Ltd.
10. dicyclopentadiene, DCPD, purchased from Henghe Materials & Science Technology Co., Ltd.
11. tris(2-hydroxyethyl) isocyanurate triacrylate, SR368 NS, purchased from Sartomer.
12. methacryloyl chloride, A104614, purchased from Aladdin.
13. polyphenylmethane maleimide, BMI-2300, purchased from Daiwakasei Industry Co., Ltd.
14. maleimide resin containing aliphatic long chain structure, BMI-3000, purchased from Designer Molecules Inc.

15. 3,3'-dimethyl-5,5'-diethyl-4,4'-diphenylmethane bismaleimide, BMI-70, purchased from K. I Chemical Industry Co., Ltd.
16. methacrylate-terminated polyphenylene ether, SA-9000, purchased from SABIC.
17. active ester, HPC 8000, purchased from DIC Corporation.
18. cyanate ester resin, BA-230S, purchased from Lonza.
18. silica, D70, purchased from Suzhou Jinyi New Materials Technology Co., Ltd.
19. dicumyl peroxide, DCP, purchased from Orica Australia.
20. methyl ethyl ketone (MEK), purchased from Sinopec Group.

Components prepared by the Applicant used in Examples and Comparative Examples correspond to the products obtained from Preparation Example 1 to Preparation Example 7.

Preparation Example 1: Synthesis of vinylbenzyl-dicyclopentadiene phenylene ether 80 g (0.1 mole) of PD-9110 (number average molecular weight Mn=800 g/mol, as illustrated by Formula (18), wherein n is a positive integer of 1 to 10, available from Chang Chun Plastics), 64 g (0.42 mole) of 4-chloro-methyl styrene (CMS-P) and 100 g of toluene were loaded to a reaction tank set at 50-80° C. and stirred for 6 hours, followed by adding 16.8 g (0.42 mole) of sodium hydroxide and 11 g (0.03 mole) of tetrabutylammonium iodide and stirring for 4 hours; after that, the reaction was washed with methanol and distilled water to obtain the vinylbenzyl-dicyclopentadiene phenylene ether at a dark brown viscous liquid state.

Preparation Example 2: Synthesis of allyl-Containing dicyclopentadiene benzoxazine Resin At ambient temperature, 228 g (0.4 mole) of allylamine and 80 g (0.1 mole) of PD-9110 (number average molecular weight Mn=800 g/mol, as illustrated by Formula (18), wherein n is a positive integer of 1 to 10, available from Chang Chun Plastics) were loaded to a reaction tank, followed by adding 240 g (0.8 mole) of formaldehyde solution and then heating to 90-100° C. to proceed the reaction for 3-6 hours. After the reaction was completed, water was removed and the system was heated to 110-130° C. until it became clear and transparent, thereby obtaining the allyl-containing dicyclopentadiene benzoxazine resin.

Preparation Example 3: Synthesis of Dicyclopentadiene Benzoxazine Resin

At ambient temperature, 372 g (0.4 mole) of aniline and 80 g (0.1 mole) of PD-9110 (number average molecular weight Mn=800 g/mol, as illustrated by Formula (18), wherein n is a positive integer of 1 to 10, available from Chang Chun Plastics) were loaded to a reaction tank, followed by adding 240 g (0.8 mole) of formaldehyde solution and then heating to 90-100° C. to proceed the reaction for 3-6 hours. After the reaction was completed, water was removed and the system was heated to 110-130° C. until it became clear and transparent, thereby obtaining the dicyclopentadiene benzoxazine resin.

Preparation Example 4: Synthesis of Prepolymer of Polybutadiene and Benzoxazine Resin To a reactor, 15 parts by weight of bisphenol A benzoxazine resin and 0.229 part by weight of aluminum chloride were added and dispersed in a dichloromethane solvent, the temperature was controlled at 50-60° C., and the reaction was stirred for 1-2 hours to induce ring opening of the bisphenol A benzoxazine resin; then 5 parts by weight of polybutadiene and 0.04 part by weight of 1-methyl-3-n-butylimidazolium fluoroborate were added and reacted under a pressure of 0.5-0.8 Mpa and a temperature of 70-100° C. for three hours, followed by cooling and purification to obtain the prepolymer of polybutadiene and benzoxazine resin.

Preparation Example 5: Synthesis of Prepolymer of Dicyclopentadiene and Benzoxazine Resin The same processes described in Preparation Example 4 were used except that 5 parts by weight of polybutadiene were replaced by 5 parts by weight of dicyclopentadiene.

Preparation Example 6: Synthesis of Prepolymer of tris(2-hydroxyethyl) isocyanurate triacrylate and benzoxazine resin The same processes described in Preparation Example 4 were used except that 5 parts by weight of polybutadiene were replaced by 5 parts by weight of tris(2-hydroxyethyl) isocyanurate triacrylate.

Preparation Example 7: Synthesis of prepolymer of methacryloyl chloride and benzoxazine resin To a reactor, 15 parts by weight of bisphenol A benzoxazine resin and 0.229 part by weight of aluminum chloride were added and dispersed in a dichloromethane solvent, the temperature was controlled at 50-60° C., and the reaction was stirred for 1-2 hours to induce ring opening of the bisphenol A benzoxazine resin; then 5 parts by weight of methacryloyl chloride and a proper amount of 10% NaOH solution were added and reacted under a temperature of 40-60° C. for three hours, followed by washing with water and purification to obtain the prepolymer of methacryloyl chloride and benzoxazine resin.

For the property tests of Examples E1 to E11 and Comparative Examples C1 to C11 listed in Tables 3, 4, 7 and 8, samples (specimens) were prepared as described below and tested under specified conditions as follows.
1. Prepreg: Resin composition from each Example (Tables 1-2) or each Comparative Example (Tables 5-6) was individually well-mixed to form a varnish, which was then loaded to an impregnation tank; a fiberglass fabric (e.g., 2116 E-glass fiber fabric, 1078 E-glass fiber fabric or 1027 E-glass fiber fabric, all available from Asahi) was impregnated into the impregnation tank to adhere the resin composition onto the fiberglass fabric, followed by heating at 150° C. to 170° C. to B-stage to obtain a prepreg.
2. Copper-clad laminate (5-ply, formed by lamination of five prepregs): Two 18 μm RTF copper foils (reverse treated copper foils) and five prepregs obtained from 2116 E-glass fiber fabrics impregnated with each Example or Comparative Example and having a resin content of about 55% were prepared and stacked in the order of one RTF copper foil, five prepregs and one RTF copper foil, followed by lamination under vacuum at 420 psi and 200° C. for 2 hours to form a copper-clad laminate. Insulation layers between the two copper foils were formed by laminating five sheets of prepreg, and the resin content of the insulation layers is about 55%.

3. Copper-free laminate (5-ply, formed by lamination of five prepregs): Each aforesaid copper-clad laminate was etched to remove the two copper foils to obtain a copper-free laminate (5-ply), which was formed by laminating five sheets of prepreg and had a resin content of about 55%.

4. Copper-free laminate (2-ply, formed by lamination of two prepregs): Two 18 μm HTE copper foils and two prepregs obtained from 2116 E-glass fiber fabrics impregnated with each Example or Comparative Example were prepared and stacked in the order of one copper foil, two prepregs and one copper foil, followed by lamination under vacuum at 420 psi and 200° C. for 2 hours to form a copper-clad laminate (2-ply, formed by lamination of two prepregs). Next, each copper-clad laminate was etched to remove the two copper foils to obtain a copper-free laminate (2-ply) which is formed by laminating two prepregs and has a resin content of about 55%.

Each sample was analyzed as described below.

1. Reflow Shrinkage (Shrinkage of Resin after Reflow)

The aforesaid copper-free laminate (2-ply) was used as the specimen and tested by using a three-dimensional measuring instrument by reference to the process of IPC-TM-650 2.4.39 (Dimensional Stability, Glass Reinforced Thin Laminates), wherein the copper-free laminate before reflow was tested first (pre-reflow), and then the copper-free laminate was subject to one 260° C. reflow cycle and tested again (post-reflow). In the test results, the method employed by the present disclosure is different from IPC-TM-650 2.4.39 as it measured the dimensional change of a laminate before and after reflow. Lower reflow shrinkage represents better laminate property. In particular, reflow shrinkage represents the dimensional change of a copper-free laminate subject to one reflow cycle and has a unit of ppm. Reflow shrinkage may be calculated according to the following equation:

reflow shrinkage=((dimension of copper-free laminate before reflow−dimension of copper-free laminate after reflow)/dimension of copper-free laminate before reflow)* 100%.

2. T288 Thermal Resistance

The aforesaid copper-clad laminate (5-ply) was used as the specimen and subject to the T288 thermal resistance test. At a constant temperature of 288° C., a thermomechanical analyzer (TMA) was used by reference to IPC-TM 650 2.4.24.1 "Time to Delamination (TMA Method)" to measure each specimen and record the time to delamination; if delamination was not observed after heating for 130 minutes, a designation ">130" was given.

3. Ten-Layer Board T300 Thermal Resistance

First, a core was prepared as follows: a prepreg prepared from each Example or each Comparative Example impregnated with a 2116 E-glass fiber fabric (resin content of about 55%) was superimposed on both sides with a piece of 18 μm RTF copper foil, followed by lamination and curing for 2 hours under vacuum at high temperature (200° C.) and high pressure (420 psi) to obtain a copper-clad core. Then the copper-clad core obtained above was etched to remove the two copper foils so as to obtain a copper-free core, and four copper-free cores were prepared using the method described above. Next, two 18 μm RTF copper foils and ten prepregs obtained from 2116 E-glass fiber fabrics impregnated with each Example or Comparative Example were prepared and stacked in the order of one copper foil, two prepregs, one copper-free core, two prepregs, one copper-free core, two prepregs, one copper-free core, two prepregs, one copper-free core, two prepregs, and one copper foil, followed by lamination under vacuum at 420 psi and 200° C. for 2 hours to form a copper-clad ten-layer board. The aforesaid copper-clad ten-layer board was used as the specimen and subject to the ten-layer board T300 thermal resistance test. At a constant temperature of 300° C., a thermomechanical analyzer (TMA) was used by reference to IPC-TM 650 2.4.24.1 "Time to Delamination (TMA Method)" to measure each specimen and record the time to delamination; if delamination was not observed after heating for 130 minutes, a designation ">130" was given.

4. Dissipation Factor (Df)

In the dissipation factor measurement, the copper-free laminate (2-ply) was tested by using a microwave dielectrometer available from AET Corp. by reference to JIS C2565 "Measuring methods for ferrite cores for microwave device" at 10 GHz for analyzing each specimen. Lower dissipation factor represents better dielectric properties of the specimen. Under a 10 GHz frequency, for a Df value of less than 0.005, a difference in Df of less than 0.0001 represents no substantial difference in dissipation factor in different laminates, and a difference in Df value of greater than 0.0001 represents a significant difference (i.e., significant technical difficulty) in dissipation factor in different laminates.

5. Copper Foil Peeling Strength (Peeling Strength, P/S)

The aforesaid copper-clad laminate (5-ply) was cut into a rectangular sample with a width of 24 mm and a length of greater than 60 mm, which was etched to remove surface copper foil to leave a rectangular copper foil with a width of 3.18 mm and a length of greater than 60 mm to be tested by using a tensile strength tester by reference to IPC-TM-650 2.4.8 at room temperature (about 25° C.) to measure the force (lb/in) required to separate the copper foil from the insulation layer of the laminate.

6. Resin Filling Property in Open Area (15 Inch*20 Inch in Size)

First, a core was prepared as follows: a prepreg (using 1078 E-glass fiber fabric, resin content of about 64%) prepared from each Example (E1 to E11) or each Comparative Example (C1 to C11) was superimposed on both sides with a piece of 18 μm HTE copper foil, followed by lamination and curing for 2 hours under vacuum at high temperature (200° C.) and high pressure (420 psi) to obtain a copper-clad core. The copper-clad core was subject to conventional inner layer trace processes according to the Gerber Format Specification. First, the copper-clad core was treated by surface roughening on the copper foils by grinding and micro-etching, and then a photoresist dry film was tightly attached to the copper-clad core with proper temperature and pressure conditions. The core attached with the photoresist dry film was exposed in a UV exposure machine, during which the photoresist performed polymerization after UV radiation on the transparent area of the artwork (the dry film at the area was preserved as etching resist in the subsequent development and copper etching steps), so as to transfer the trace image on the artwork to the photoresist dry film. The protective membrane on the film was torn down, and the area not subject to radiation on the film was removed by a sodium bicarbonate solution, followed by etching off the exposed copper foil with a mixture solution of hydrochloric acid and hydrogen peroxide so as to form traces and an open area. Then a sodium hydroxide solution was used to wash off the photoresist dry film to obtain an inner layer wiring board. The inner layer wiring board was subject to a brown oxidation process to obtain a brown oxide treated inner layer wiring board, which had an insulation layer of 2.5 mil in thickness.

A prepreg (prepared from each Example E1 to E11 or each Comparative Example C1 to C11 using 1027 E-glass fiber fabric, resin content of about 69%, 1.5 mil in thickness) was superimposed on both sides of the brown oxide treated inner layer wiring board, and the other side of each prepreg opposite to the brown oxide treated inner layer wiring board was covered with a piece of 18 μm HTE copper foil, followed by lamination and curing for 2 hours under vacuum at high temperature (200° C.) and high pressure (420 psi) to obtain a copper-clad multi-layer board. The copper foils on the copper-clad multi-layer board were removed such as by etching to obtain a sample for the resin filling property in open area test. A 10× optical microscope was used to observe the open area (15 inch*20 inch in size) of the sample for the resin filling property in open area test to determine the presence of branch-like patterns in the open area. A designation "p/p" is given to represent "presence of branch-like pattern", and a designation "a/p" is given to represent "absence of branch-like pattern".

TABLE 1

Resin compositions of Examples E1 to E5 (in part by weight)

| Component | | E1 | E2 | E3 | E4 | E5 |
|---|---|---|---|---|---|---|
| prepolymer of crosslinking agent and benzoxazine resin | prepolymer of polybutadiene and benzoxazine resin | 20 | 10 | 45 | 20 | 20 |
| | prepolymer of dicyclopentadiene and benzoxazine resin | | | | | |
| | prepolymer of tris(2-hydroxyethyl) isocyanurate triacrylate and benzoxazine resin | | | | | |
| | prepolymer of methacryloyl chloride and benzoxazine resin | | | | | |
| maleimide resin | BMI-2300 | 50 | 50 | 50 | 30 | 70 |
| | BMI-3000 | | | | | |
| | BMI-70 | | | | | |
| polyphenylene ether resin | | | | | | |
| vinylbenzyl-dicyclopentadiene phenylene ether | | | | | | |
| cyanate ester resin | | | | | | |
| active ester | | | | | | |
| inorganic filler | silica | 60 | 60 | 60 | 60 | 60 |
| curing accelerator | dicumyl peroxide | 0.3 | 0.3 | 0.3 | 0.3 | 0.3 |
| solvent | methyl ethyl ketone | PA | PA | PA | PA | PA |

Note:
"PA" represents "proper amount".

TABLE 2

Resin compositions of Examples E6 to E11 (in part by weight)

| Component | | E6 | E7 | E8 | E9 | E10 | E11 |
|---|---|---|---|---|---|---|---|
| prepolymer of crosslinking agent and benzoxazine resin | prepolymer of polybutadiene and benzoxazine resin | | | | 15 | 20 | 20 |
| | prepolymer of dicyclopentadiene and benzoxazine resin | 20 | | | 5 | | |
| | prepolymer of tris(2-hydroxyethyl) isocyanurate triacrylate and benzoxazine resin | | 20 | | 3 | | |
| | prepolymer of methacryloyl chloride and benzoxazine resin | | | 20 | 2 | | |
| crosslinking agent | polybutadiene | | | | | | 3 |
| | dicyclopentadiene | | | | | | |
| | tris(2-hydroxyethyl) isocyanurate triacrylate | | | | | | |
| | methacryloyl chloride | | | | | | |
| maleimide resin | BMI-2300 | 50 | 50 | 50 | 50 | | 30 |
| | BMI-3000 | | | | | | 10 |
| | BMI-70 | | | | | 50 | 10 |
| polyphenylene ether resin | | | | | | | 5 |

TABLE 2-continued

Resin compositions of Examples E6 to E11 (in part by weight)

| Component | | E6 | E7 | E8 | E9 | E10 | E11 |
|---|---|---|---|---|---|---|---|
| vinylbenzyl-dicyclopentadiene phenylene ether | | | | | | | 10 |
| cyanate ester resin | | | | | | | 5 |
| active ester | | | | | | | 10 |
| inorganic filler | silica | 60 | 60 | 60 | 60 | 60 | 70 |
| curing accelerator | dicumyl peroxide | 0.3 | 0.3 | 0.3 | 0.3 | 0.3 | 0.3 |
| solvent | methyl ethyl ketone | PA | PA | PA | PA | PA | PA |

TABLE 3

Test results of articles made from resin compositions of Examples E1 to E5

| Test Item | Unit | E1 | E2 | E3 | E4 | E5 |
|---|---|---|---|---|---|---|
| reflow shrinkage | ppm | 120 | 140 | 105 | 121 | 145 |
| T288 | min | >130 | >130 | >130 | >130 | >130 |
| ten-layer board T300 | min | >130 | >130 | >130 | >130 | >130 |
| Df | — | 0.0058 | 0.0059 | 0.0060 | 0.0058 | 0.0060 |
| P/S | lb/in | 4.5 | 4.2 | 4.7 | 4.2 | 4.7 |
| resin filling property in open area | — | a/p | a/p | a/p | a/p | a/p |

TABLE 4

Test results of articles made from resin compositions of Examples E6 to E11

| Test Item | Unit | E6 | E7 | E8 | E9 | E10 | E11 |
|---|---|---|---|---|---|---|---|
| reflow shrinkage | ppm | 105 | 122 | 121 | 119 | 112 | 64 |
| T288 | min | >130 | >130 | >130 | >130 | >130 | >130 |
| ten-layer board T300 | min | >130 | >130 | >130 | >130 | >130 | >130 |
| Df | — | 0.0058 | 0.0058 | 0.0059 | 0.0057 | 0.0056 | 0.0042 |
| P/S | lb/in | 4.5 | 4.6 | 4.7 | 4.6 | 4.3 | 4.1 |
| resin filling property in open area | — | a/p | a/p | a/p | a/p | a/p | a/p |

TABLE 5

Resin compositions of Comparative Examples C1 to C4 (in part by weight)

| Component | | C1 | C2 | C3 | C4 |
|---|---|---|---|---|---|
| prepolymer of crosslinking agent and benzoxazine resin | prepolymer of polybutadiene and benzoxazine resin | 0 | 50 | 20 | 20 |
| | prepolymer of dicyclopentadiene and benzoxazine resin | | | | |
| | prepolymer of tris(2-hydroxyethyl) isocyanmate triacrylate and benzoxazine resin | | | | |
| | prepolymer of methacryloyl chloride and benzoxazine resin | | | | |
| crosslinking agent | polybutadiene dicyclopentadiene tris(2-hydroxyethyl) isocyanmate triacrylate methacryloyl chloride | | | | |
| maleimide resin | BMI-2300 BMI-3000 BMI-70 | 50 | 50 | 25 | 80 |
| inorganic filler | silica | 60 | 60 | 60 | 60 |
| curing accelerator | dicumyl peroxide | 0.3 | 0.3 | 0.3 | 0.3 |
| solvent | methyl ethyl ketone | PA | PA | PA | PA |

TABLE 6

Resin compositions of Comparative Examples C5 to C11 (in part by weight)

| | Component | C5 | C6 | C7 | C8 | C9 | C10 | C11 |
|---|---|---|---|---|---|---|---|---|
| conventional benzoxazine resin | allyl-containing dicyclopentadiene benzoxazine resin | | | | | 20 | | |
| | bisphenol A benzoxazine resin | 15 | 15 | 15 | 15 | | 20 | |
| | dicyclopentadiene benzoxazine resin | | | | | | | 20 |
| crosslinking agent | polybutadiene | 5 | | | | | | |
| | dicyclopentadiene | | 5 | | | | | |
| | tris(2-hydroxyethyl) isocyanurate triacrylate | | | 5 | | | | |
| | methacryloyl chloride | | | | 5 | | | |
| maleimide resin | BMI-2300 | 50 | 50 | 50 | 50 | 50 | 50 | 50 |
| | BMI-3000 | | | | | | | |
| | BMI-70 | | | | | | | |
| inorganic filler | silica | 60 | 60 | 60 | 60 | 60 | 60 | 60 |
| curing accelerator | dicumyl peroxide | 0.3 | 0.3 | 0.3 | 0.3 | 0.3 | 0.3 | 0.3 |
| solvent | methyl ethyl ketone | PA | PA | PA | PA | PA | PA | PA |

TABLE 7

Test results of articles made from resin compositions of Comparative Examples C1 to C4

| Test Item | Unit | C1 | C2 | C3 | C4 |
|---|---|---|---|---|---|
| reflow shrinkage | ppm | 320 | 102 | 126 | 200 |
| T288 | min | >130 | >130 | >130 | >130 |
| ten-layer board T300 | min | 81 | 20 | 85 | >130 |
| Df | — | 0.0062 | 0.0057 | 0.0058 | 0.0062 |
| P/S | lb/in | 3.8 | 4.9 | 3.8 | 5.5 |
| resin filling property in open area | — | p/p | a/p | a/p | a/p |

TABLE 8

Test results of articles made from resin compositions of Comparative Examples C5 to C11

| Test Item | Unit | C5 | C6 | C7 | C8 | C9 | C10 | C11 |
|---|---|---|---|---|---|---|---|---|
| reflow shrinkage | ppm | 232 | 240 | 233 | 242 | 215 | 209 | 195 |
| T288 | min | >130 | >130 | >130 | >130 | >130 | >130 | >130 |
| ten-layer board T300 | min | 85 | 65 | 100 | 86 | 68 | 65 | 102 |
| Df | — | 0.0061 | 0.0063 | 0.0061 | 0.0064 | 0.0072 | 0.0072 | 0.0070 |
| P/S | lb/in | 4.2 | 4.5 | 4.3 | 4.4 | 4.4 | 4.4 | 4.2 |
| resin filling property in open area | — | p/p | p/p | p/p | p/p | a/p | a/p | a/p |

The following observations can be made from Table 1 to Table 8.

Examples E1 to E3, which use a resin composition containing (A) 10 parts by weight to 45 parts by weight of the prepolymer of crosslinking agent and benzoxazine resin according to the present disclosure, compared with Comparative Example C1, which does not contain the prepolymer of crosslinking agent and benzoxazine resin, achieve low reflow shrinkage, high ten-layer board T300 thermal resistance, lower dissipation factor, higher copper foil peeling strength and absence of branch-like pattern in the resin filling property in open area test. In addition, if the amount of the prepolymer of crosslinking agent and benzoxazine resin exceeds the aforesaid range (such as Comparative Example C2, containing 50 parts by weight of the prepolymer of crosslinking agent and benzoxazine resin), the ten-layer board T300 thermal resistance is significantly lowered.

Examples E1 and E6 to E8, which use a resin composition containing the prepolymer of crosslinking agent and benzoxazine resin according to the present disclosure, compared with Comparative Examples which use a conventional benzoxazine resin (such as Comparative Example C9, which uses allyl-containing dicyclopentadiene benzoxazine resin, Comparative Example C10, which uses bisphenol A benzoxazine resin, and Comparative Example C11, which uses dicyclopentadiene benzoxazine resin), achieve low reflow shrinkage, high ten-layer board T300 thermal resistance and lower dissipation factor. Compared with Comparative Examples which use crosslinking agent and benzoxazine resin added separately without prepolymerization (such as Comparative Example C5, which contains bisphenol A benzoxazine resin and polybutadiene separately, Comparative Example C6, which contains bisphenol A benzoxazine resin and dicyclopentadiene separately, Comparative Example C7, which contains bisphenol A benzoxazine resin and tris(2-hydroxyethyl) isocyanurate triacrylate separately, and Comparative Example C8, which contains bisphenol A benzoxazine resin and methacryloyl chloride separately), it can be found that Examples E1 and E6 to E8 achieve low reflow shrinkage, high ten-layer board T300 thermal resistance, lower dissipation factor and absence of branch-like pattern in the resin filling property in open area test.

Examples E1, E4 and E5, which use a resin composition containing (B) 30 parts by weight to 70 parts by weight of the maleimide resin according to the present disclosure, compared with Comparative Example C3 with insufficient maleimide resin (e.g., 25 parts by weight of the maleimide resin), achieve high ten-layer board T300 thermal resistance and higher copper foil peeling strength. Compared with Comparative Example C4 with excessive maleimide resin (e.g., 80 parts by weight of the maleimide resin), Examples E1, E4 and E5 achieve low reflow shrinkage and lower dissipation factor.

Overall, it can be found that articles made from resin compositions comprising (A)10 parts by weight to 45 parts by weight of the prepolymer of crosslinking agent and benzoxazine resin and (B) 30 parts by weight to 70 parts by weight of the maleimide resin according to the present disclosure achieve excellent laminate reflow shrinkage and ten-layer board T300 thermal resistance and improvements in at least one, more or all of the properties including laminate T288 thermal resistance, dissipation factor, copper foil peeling strength, and resin filling property in open area.

Moreover, it can be found that resin compositions comprising (A)10 parts by weight to 45 parts by weight of the prepolymer of crosslinking agent and benzoxazine resin and (B) 30 parts by weight to 70 parts by weight of the maleimide resin according to the present disclosure, if further contain polyphenylene ether resin, vinylbenzyl-dicyclopentadiene phenylene ether, active ester, polyolefin and cyanate ester resin, such as Example E11, may further lower the dissipation factor and the reflow shrinkage without influencing other properties.

The above detailed description is merely illustrative in nature and is not intended to limit the embodiments of the subject matter or the applications and uses of such embodiments. As used herein, the term "exemplary" or similar expression means "serving as an example, instance, or illustration." Any implementation described herein as exemplary is not necessarily to be construed as preferred or advantageous over other implementations, unless otherwise specified.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments and equivalents thereof. Also, the scope defined by the claims includes known equivalents and foreseeable equivalents at the time of filing this patent application.

What is claimed is:

1. A resin composition, comprising:
    (A) 10 parts by weight to 45 parts by weight of a prepolymer of crosslinking agent and benzoxazine resin; and
    (B) 30 parts by weight to 70 parts by weight of a maleimide resin,
    wherein the prepolymer of crosslinking agent and benzoxazine resin comprises a structure of Formula (1) below:

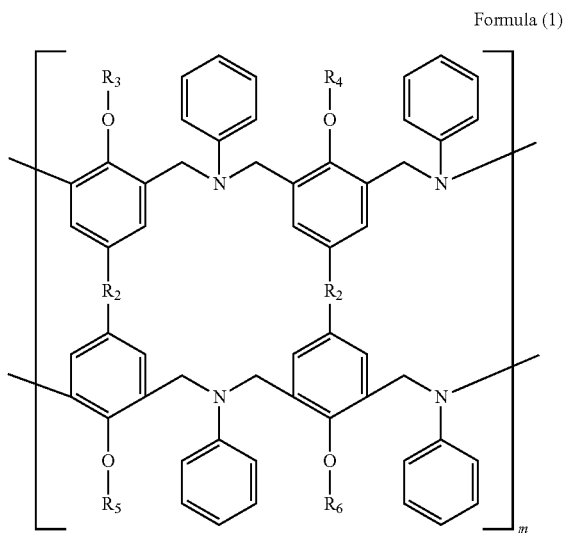

Formula (1)

wherein $R_2$ is a covalent bond, —$CH_2$—, —$CH(CH_3)$— or —$C(CH_3)_2$—; $R_3$, $R_4$, $R_5$ and $R_6$ each independently represent hydrogen or an unsaturated bond-containing group, and $R_3$, $R_4$, $R_5$ and $R_6$ are not hydrogen at the same time; and m is an integer of 1 to 10.

2. The resin composition of claim 1, wherein the prepolymer of crosslinking agent and benzoxazine resin comprises a prepolymer of olefin and benzoxazine resin, a prepolymer of acrylate and benzoxazine resin, a prepolymer of unsaturated bond-containing acyl chloride and benzoxazine resin, or a combination thereof.

3. The resin composition of claim 2, wherein the olefin comprises styrene-butadiene-divinylbenzene terpolymer, styrene-butadiene-maleic anhydride terpolymer, vinyl-polybutadiene-urethane oligomer, styrene-butadiene copolymer, styrene-isoprene copolymer, maleic anhydride-butadiene copolymer, polybutadiene, polyisoprene, butadiene, dicyclopentadiene, bis(vinylbenzyl)ether, 1,2-bis(vinylphenyl) ethane, divinylbenzene, triallyl isocyanurate, triallyl cyanurate, 1,2,4-trivinyl cyclohexane, or a combination thereof.

4. The resin composition of claim 2, wherein the acrylate comprises cyclohexane dimethanol di(meth)acrylate, ethylene glycol di(meth)acrylate, 1,4-butylene glycol di(meth)acrylate, ethoxylated bisphenol A di(meth)acrylate, tricyclodecane di(meth)acrylate, trimethylolpropane tri(meth)acrylate, [(octahydro-4,7-methano-1H-indene-5,6-diyl)bis(methylene)] di(meth)acrylate, tris(2-hydroxyethyl) isocyanurate tri(meth)acrylate, trimethylolpropane tri(meth)acrylate, ethoxylated trimethylolpropane tri(meth)acrylate, pentaerythritol tetra(meth)acrylate, or a combination thereof.

5. The resin composition of claim 2, wherein the unsaturated bond-containing acyl chloride comprises methacryloyl chloride, cinnamyl chloride, crotonyl chloride, trans-8-methyl-6-nonanoyl chloride, 10-undecenoyl chloride, or a combination thereof.

6. The resin composition of claim 1, wherein the prepolymer of crosslinking agent and benzoxazine resin comprises a prepolymer of polybutadiene and benzoxazine resin, a prepolymer of dicyclopentadiene and benzoxazine resin, a prepolymer of tris(2-hydroxyethyl) isocyanurate triacrylate and benzoxazine resin, a prepolymer of methacryloyl chloride and benzoxazine resin, or a combination thereof.

7. The resin composition of claim 1, wherein the prepolymer of crosslinking agent and benzoxazine resin comprises a structure of any one of Formula (4) to Formula (9) below or a combination thereof:
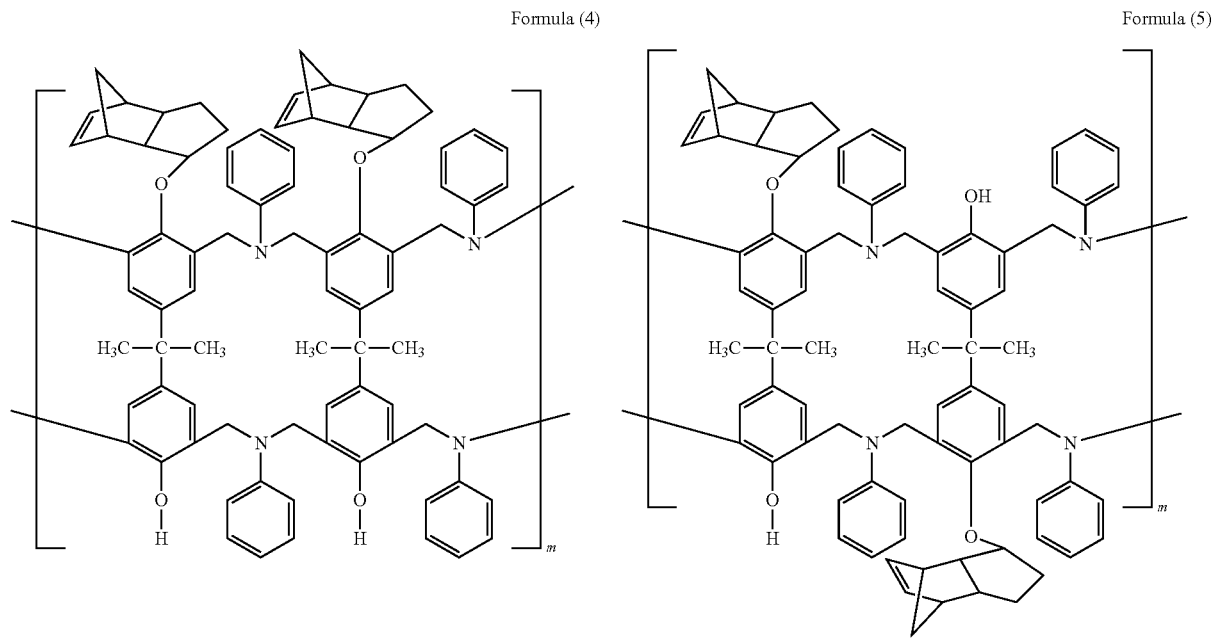
Formula (4)
Formula (5)
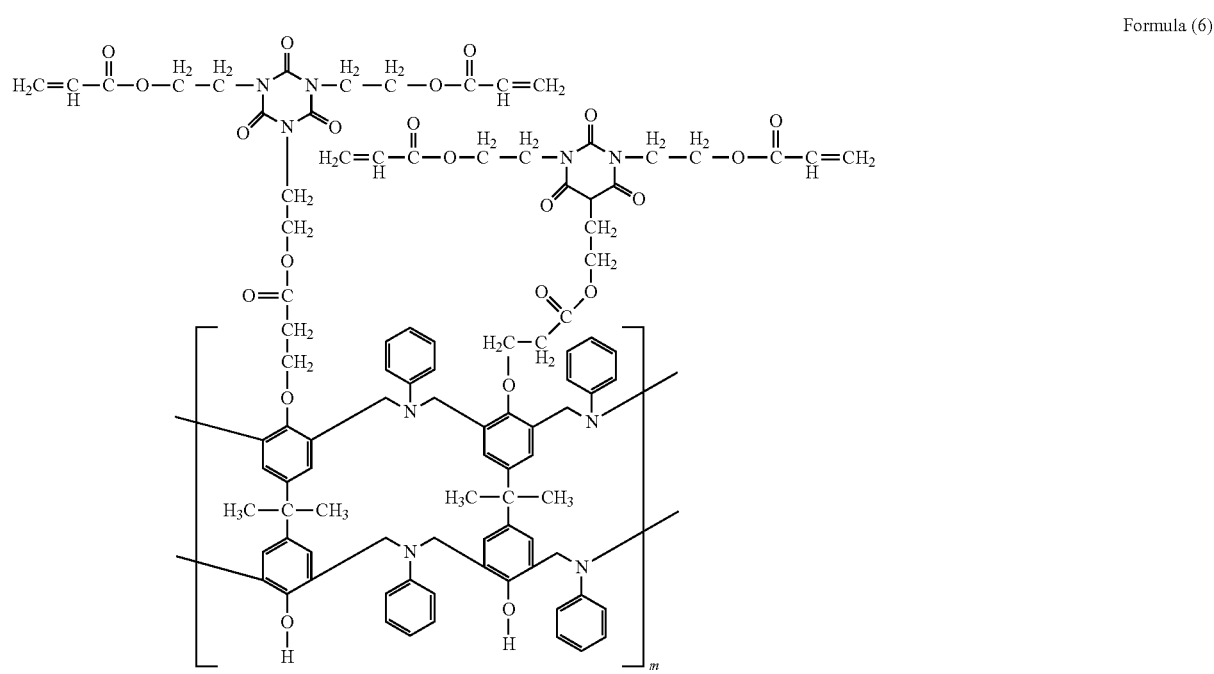
Formula (6)

Formula (7)

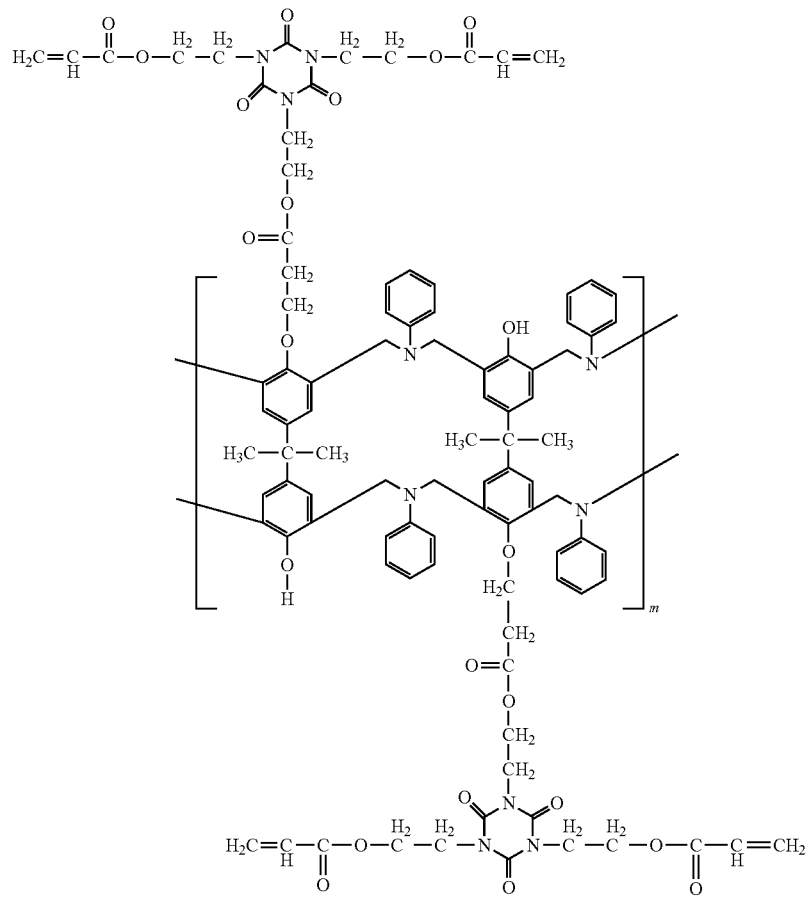

Formula (8) Formula (9)

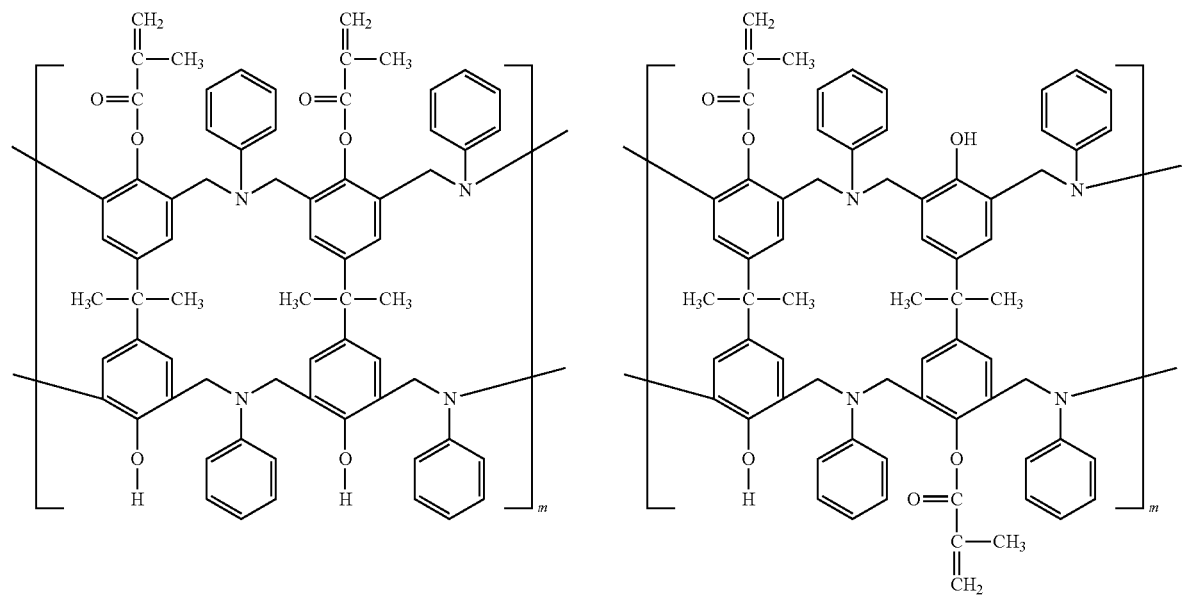

wherein m is an integer of 1 to 10.

8. The resin composition of claim 1, wherein the maleimide resin comprises 4,4'-diphenylmethane bismaleimide, polyphenylmethane maleimide, bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenyl maleimide, vinyl benzyl maleimide, prepolymer of diallyl compound and maleimide resin, prepolymer of diamine and maleimide resin, prepolymer of multi-functional amine and maleimide resin, prepolymer of acid phenol compound and maleimide resin, or a combination thereof.

9. The resin composition of claim 1, further comprising polyphenylene ether resin, vinylbenzyl-dicyclopentadiene phenylene ether, cyanate ester resin, active ester, bis(vinylbenzyl)ether, 1,2-bis(vinylphenyl)ethane, divinylbenzene, triallyl isocyanurate, triallyl cyanurate, 1,2,4-trivinyl cyclohexane, diallyl bisphenol A, styrene, acrylate, polyolefin, epoxy resin, phenolic resin, styrene maleic anhydride, amine curing agent, polyamide, polyimide, or a combination thereof.

10. The resin composition of claim 1, further comprising flame retardant, inorganic filler, curing accelerator, solvent, silane coupling agent, surfactant, coloring agent, toughening agent, or a combination thereof.

11. An article made from the resin composition of claim 1, comprising a prepreg, a resin film, a resin-coated copper, a laminate, or a printed circuit board.

12. The article of claim 11, having a dissipation factor at 10 GHz as measured by reference to JIS C2565 of less than or equal to 0.0060.

13. The article of claim 11, having a copper foil peeling strength as measured by using a tensile strength tester by reference to IPC-TM-650 2.4.8 of greater than or equal to 4.0 lb/in.

14. The article of claim 11, having a T288 thermal resistance as measured by reference to IPC-TM-650 2.4.24.1 of greater than 130 minutes.

15. The article of claim 11, having a ten-layer board T300 thermal resistance as measured by reference to IPC-TM-650 2.4.24.1 of greater than 130 minutes.

16. The article of claim 11, having a reflow shrinkage as measured by reference to IPC-TM-650 2.4.39 of less than or equal to 150 ppm.

* * * * *